(12) United States Patent  
Uehara et al.

(10) Patent No.: US 7,614,338 B2  
(45) Date of Patent: Nov. 10, 2009

(54) PISTON, METHOD OF PRODUCING THE PISTON, AND PUMP HAVING THE PISTON

(75) Inventors: Junichi Uehara, Otsu (JP); Kazukiyo Teshima, Sanda (JP)

(73) Assignees: Toray Engineering Co., Ltd., Tokyo (JP); Nippon Pillar Packing Co., Ltd., Osaka (JP)

(*) Notice: Subject to any disclaimer, the term of this patent is extended or adjusted under 35 U.S.C. 154(b) by 239 days.

(21) Appl. No.: 11/728,556

(22) Filed: Mar. 26, 2007

(65) Prior Publication Data

US 2007/0240564 A1 Oct. 18, 2007

(30) Foreign Application Priority Data

Apr. 13, 2006 (JP) .............................. 2006-110749

(51) Int. Cl.
*F04B 43/00* (2006.01)
*F04B 53/00* (2006.01)

(52) U.S. Cl. .................................. 92/98 D; 29/888.047

(58) Field of Classification Search ................. 92/98 D, 92/99; 29/888.047, 527.1; 417/388

See application file for complete search history.

(56) References Cited

U.S. PATENT DOCUMENTS 2,849,026 A * 8/1958 Taplin ..................... 92/103 R
4,056,043 A * 11/1977 Sriramamurty et al. ..... 92/98 D
4,749,342 A * 6/1988 Fritsch ........................ 92/98 D
4,773,305 A * 9/1988 Nissels ........................ 92/98 D
5,452,993 A * 9/1995 Lanigan .................... 417/413.1
6,079,959 A * 6/2000 Kingsford et al. ........... 92/98 D
7,293,967 B2 * 11/2007 Fukano et al. .............. 92/98 D

FOREIGN PATENT DOCUMENTS

JP          61-197779          9/1986
JP          9-53566            2/1997

* cited by examiner

*Primary Examiner*—Thomas E Lazo  
(74) *Attorney, Agent, or Firm*—William L. Androlia; H. Henry Koda

(57) ABSTRACT

A piston 1 which is to be movably supported in a cylinder 11 of a pump 10 to be reciprocally driven is formed by a fluororesin so that it is not impaired by a corrosive liquid. A cylindrical outer peripheral portion 2 of the piston 1 has a thickness of 1 mm or less, and is flexible. The outer peripheral portion has a flange portion 7 in an open end portion via an approximately 180-degree folded-back portion 3. The flange portion 7 is attached to the cylinder 11. When the pump 10 is driven, the cylindrical outer peripheral portion 2 of the piston 1 smoothly rolls without producing deflections or bends in a gap between the outer peripheral face of a piston support member 15 and the inner peripheral face of the cylinder 11, while being in close contact with the two faces.

5 Claims, 16 Drawing Sheets

Fig. 5
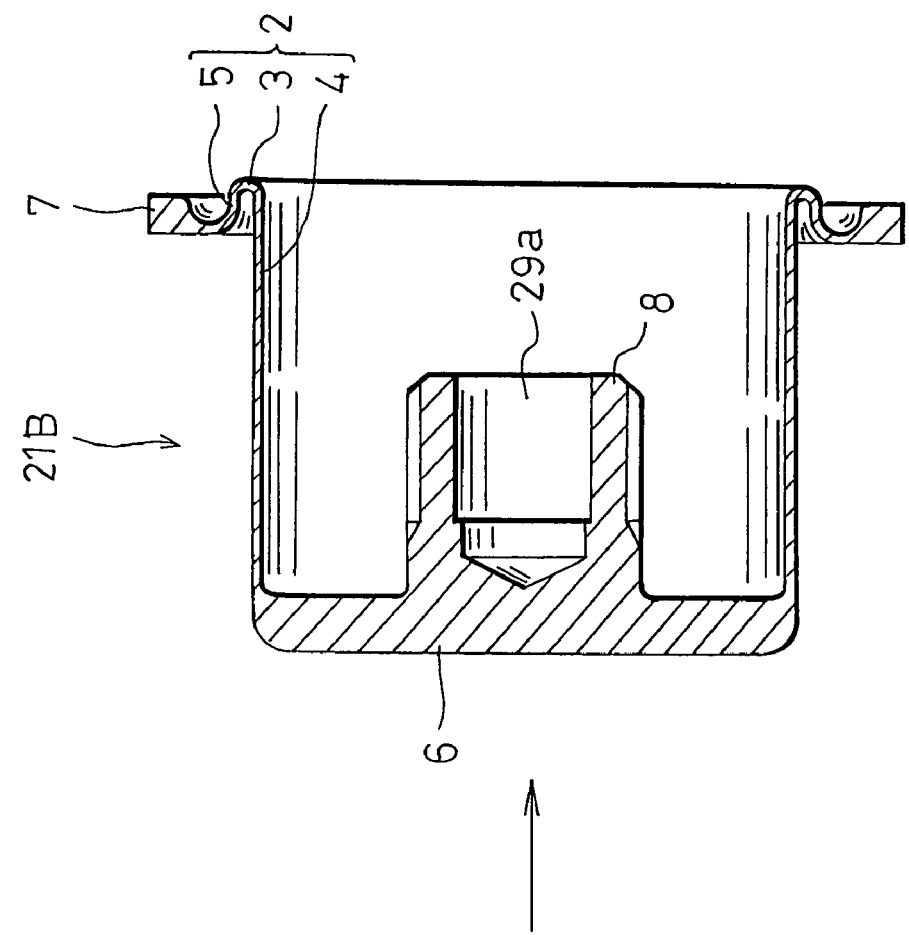
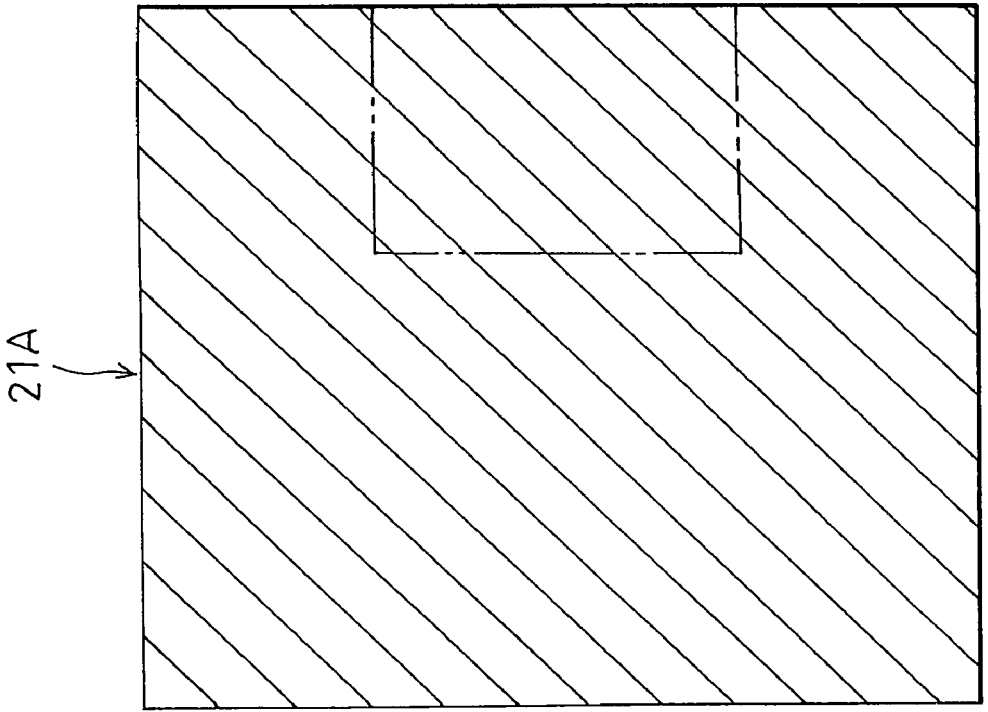

PISTON, METHOD OF PRODUCING THE PISTON, AND PUMP HAVING THE PISTON

BACKGROUND OF THE INVENTION

1. Field of the Invention

The present invention relates to a piston, a method of producing the piston, and a pump having the piston.

2. Description of the Prior Art

Among pumps, a pump is conventionally known in which a diaphragm formed by rubber is used as a piston that is movably supported in a cylinder to be reciprocally driven. In the diaphragm serving as a piston, a closed end portion of the diaphragm is attached to a piston support member which is movably supported in the cylinder to be reciprocally driven while disposing a gap between the member and the inner face of the cylinder, and a cylindrical outer peripheral portion of the diaphragm is attached to the cylinder by a flange portion which is provided in an open end portion of the outer peripheral portion via an approximately 180-degree folded-back portion. In a pump comprising such a piston, suction and discharge ports for a liquid are opened in a pressure chamber which is defined in the cylinder by the piston, and a liquid tank and a discharged-liquid supplying portion are connected to the suction and discharge ports via check valves, respectively. When the pump is driven, the cylindrical outer peripheral portion of the piston rolls in the gap between the outer face of the piston support member and the inner face of the cylinder in accordance with the reciprocal movement of the piston support member, while the cylindrical outer peripheral portion is closely contacted with the two faces, whereby the volume of the pressure chamber is changed so that the liquid is sucked from the suction port in a suction step in which the volume expands, and the liquid is discharged from the discharge port in a discharge step in which the volume contracts (for example, see Japanese Patent Application Laying-Open No. 61-197779).

However, a conventional piston made of rubber is impaired by a corrosive liquid which attacks rubber, for example, a chemical solution such as a resist solution that is to be used in a process for producing an FPD such as an LCD, or a semiconductor device. Hence, such a piston cannot be used in a pump for supplying a corrosive liquid.

Therefore, a piston which can be used in a pump for supplying a corrosive liquid has been proposed (for example, see Japanese Patent Application Laying-Open No. 9-53566). This piston is formed by a fluororesin such as PTFE (polytetrafluoroethylen) which is resistant to a corrosive liquid, and is not impaired by a corrosive liquid. Unlike rubber, however, a fluororesin is not flexible and stretchable. Therefore, the section shape of a cylindrical outer peripheral portion of the piston is not circular but polygonal, so that bent portions are formed. Consequently, cracks, holes, or the like are formed in the piston, and the piston has a problem in durability.

The following technique has been proposed as means for improving the durability of a piston made of a fluororesin (see Japanese Patent Application Laying-Open No. 9-53566). In the technique, a tapered portion which is more thinned as further advancing toward a pressure chamber is disposed on the outer face of a piston support member. Furthermore, an inclination angle of a cylindrical outer peripheral portion of the piston and directed toward a driving chamber (which is defined on the side opposite to the pressure chamber across the piston), and that of the tapered portion and directed toward the pressure chamber are set to be substantially equal to each other. In the means, however, the cylindrical outer peripheral portion of the piston can be closely contacted with the outer face of the piston support member, but not with the inner face of a cylinder, and a gap is formed between the outer peripheral portion and the cylinder inner face. Therefore, undulating deflections or bends are produced in the cylindrical outer peripheral portion of the piston, and cracks, holes, or the like are formed in the piston.

SUMMARY OF THE INVENTION

Problems to be solved by the invention are as follows. In the conventional piston made of a fluororesin, unlike a piston made of rubber, the cylindrical outer peripheral portion of the piston does not have a sufficient flexibility, and hence it is difficult to cause the cylindrical outer peripheral portion to smoothly roll without producing deflections or bends in the gap between the outer face of the piston support member and the inner face of the cylinder, while being in close contact with the two faces. Therefore, cracks, holes, or the like are formed in the piston, and a durability which is practically sufficient cannot be ensured. When cracks or holes are formed in the cylindrical outer peripheral portion of the piston, there is a case where a space is formed between a deflected or bent portion and the folded-back portion. Air may remains in the space, and the quantitative performance of the pump is lowered. Furthermore, there is a case where a liquid may stagnate in the space, and the liquid displacement performance of the pump is lowered. In the case where the pump pressure chamber is to be washed, a washing liquid hardly reaches the folded-back portion because of deflections or bends which are produced in the cylindrical outer peripheral portion of the piston. Therefore, a washing process requires a prolonged time period.

In a process for producing an FPD such as an LCD, for example, the application unevenness in the case where a resist solution is applied to a glass substrate must be suppressed to 3% or less, preferably, 1% or less. Therefore, a pump for supplying a chemical solution such as the resist solution is requested to have a high constant flow rate performance at which the liquid can be continuously discharged at a constant flow rate in one discharge step. When deflections or bends are produced in the cylindrical outer peripheral portion of the piston, the flow rate in the discharge step is disturbed by the deflections or bends. Therefore, the requested constant flow rate performance cannot be obtained.

The invention has been conducted in view of the problems. It is an object of the invention to provide a piston which can be used in a pump for supplying a corrosive liquid, which can improve the durability, and the constant flow rate, quantitative, and liquid displacement performances of the pump, and which can shorten the time of washing a pump pressure chamber, a method of producing the piston, and a pump having the piston.

In order to attain the object, the piston of the invention is a piston which is to be movably supported in a cylinder to be reciprocally driven, the piston is formed by a fluororesin, a cylindrical outer peripheral portion of the piston has a thickness of 1 mm or less, and is flexible, and the outer peripheral portion has a flange portion in an open end portion of the outer peripheral portion via an approximately 180-degree folded-back portion.

In the piston of the invention, preferably, an inner diameter of the folded-back portion is 80% or more of an outer diameter. When a ratio of the inner diameter of the folded-back portion to the outer diameter (a ratio of the inner diameter of the cylindrical outer peripheral portion of the piston to the outer diameter) is excessively large, the bend radius of the folded-back portion (the gap between the outer face of the piston support member and the inner face of the cylinder) is excessively small, thereby producing a possibility that the folded-back portion buckles. Therefore, it is preferable to set the inner diameter of the folded-back portion to be less than 98% of the outer diameter.

Preferably, the piston of the invention is formed by a secondary process which, after a workpiece made of a fluororesin is cut to be molded into a piston semifinished product, is applied to the semifinished product.

The piston production method of the invention is a method of producing a piston which is to be movably supported in a cylinder to be reciprocally driven, the piston is formed by a fluororesin, a cylindrical outer peripheral portion of the piston has a thickness of 1 mm or less, and is flexible, and the outer peripheral portion has a flange portion in an open end portion of the outer peripheral portion via an approximately 180-degree folded-back portion, wherein a workpiece made of the fluororesin is cut to be molded into a semifinished product in which the folded-back portion has not yet been molded, and thereafter the folded-back portion is formed by a secondary process which is applied to the semifinished product.

In the pump of the invention, a piston which is movably supported in a cylinder to be reciprocally driven is formed by a fluororesin, a cylindrical outer peripheral portion of the piston has a thickness of 1 mm or less, and is flexible, the outer peripheral portion has a flange portion in an open end portion of the outer peripheral portion via an approximately 180-degree folded-back portion, and the flange portion is attached to the cylinder.

BRIEF DESCRIPTION OF THE DRAWINGS

FIG. 5 is a view illustrating a method of producing the piston of the second embodiment of the invention.

DETAILED DESCRIPTION OF THE PREFERRED EMBODIMENTS

Hereinafter, embodiments of the piston, the method of producing the piston, and the pump having the piston of the invention will be described with reference to the drawings.

Figure 1:
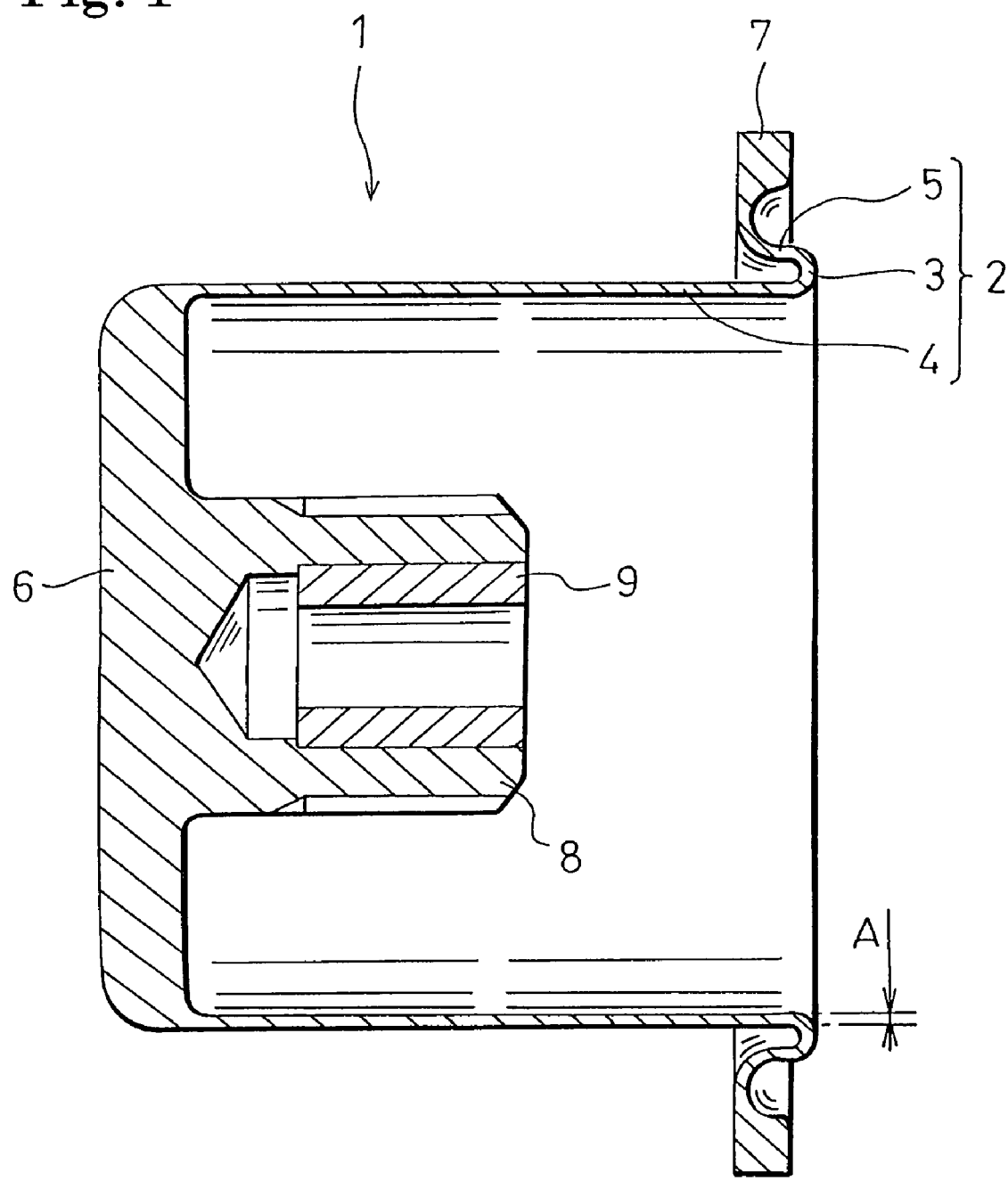
FIG. 1 is a section view showing a piston of a first embodiment of the invention.

FIG. 1 is a section view showing a piston of a first embodiment. The piston 1 is formed by a fluororesin such as PTFE (polytetrafluoroethylen), and comprises a cylindrical outer peripheral portion (hereinafter, referred to as "rolling portion") 2 which is formed by folding back (winding back) an intermediate portion to the inner side or the outer side. The rolling portion 2 is configured by: a folded-back portion 3 having a bending angle of about 180 degrees; and inner and outer peripheral portions 4, 5 which extend in the same direction from the inner and outer peripheral ends of the folded-back portion 3 in parallel with the axial line, respectively. In an end portion of the inner peripheral portion 4, a disk-like end plate portion 6 which forms the end portion into a closed end portion is disposed. In an end portion of the outer peripheral portion 5, a flange portion 7 which is an annular plate member perpendicularly rising from the end portions toward the radially outward side is disposed. Both the flat principal faces of the flange portion are directed in the axial direction. On the end plate portion 6, a cylindrical protrusion 8 which has an external thread portion on the outer peripheral face, and which is used for screw-coupling is coaxially protruded from a middle portion of the end plate portion 6 toward the inside of the inner peripheral portion 4. A metal sleeve 9 which is separately produced for screw-coupling, and which has an external thread portion on the inner and outer peripheral faces is coaxially fixed in an embedded state to the protrusion 8. In the illustrated piston 1, the rolling portion 2 is formed into an initial shape of the pull-type (the type in which the pump operation is started from the suction step) in which the outer peripheral portion 5 is shorter in length than the inner peripheral portion 4. Alternatively, the rolling portion 2 may be formed into an initial shape of the push-type (the type in which the pump operation is started from the discharge step) in which the length of the outer peripheral portion 5 is longer.

In the piston 1, the rolling portion 2 is formed so as to have a thickness A of 0.1 mm or more and 1 mm or less, and is flexible.

Figure 2:
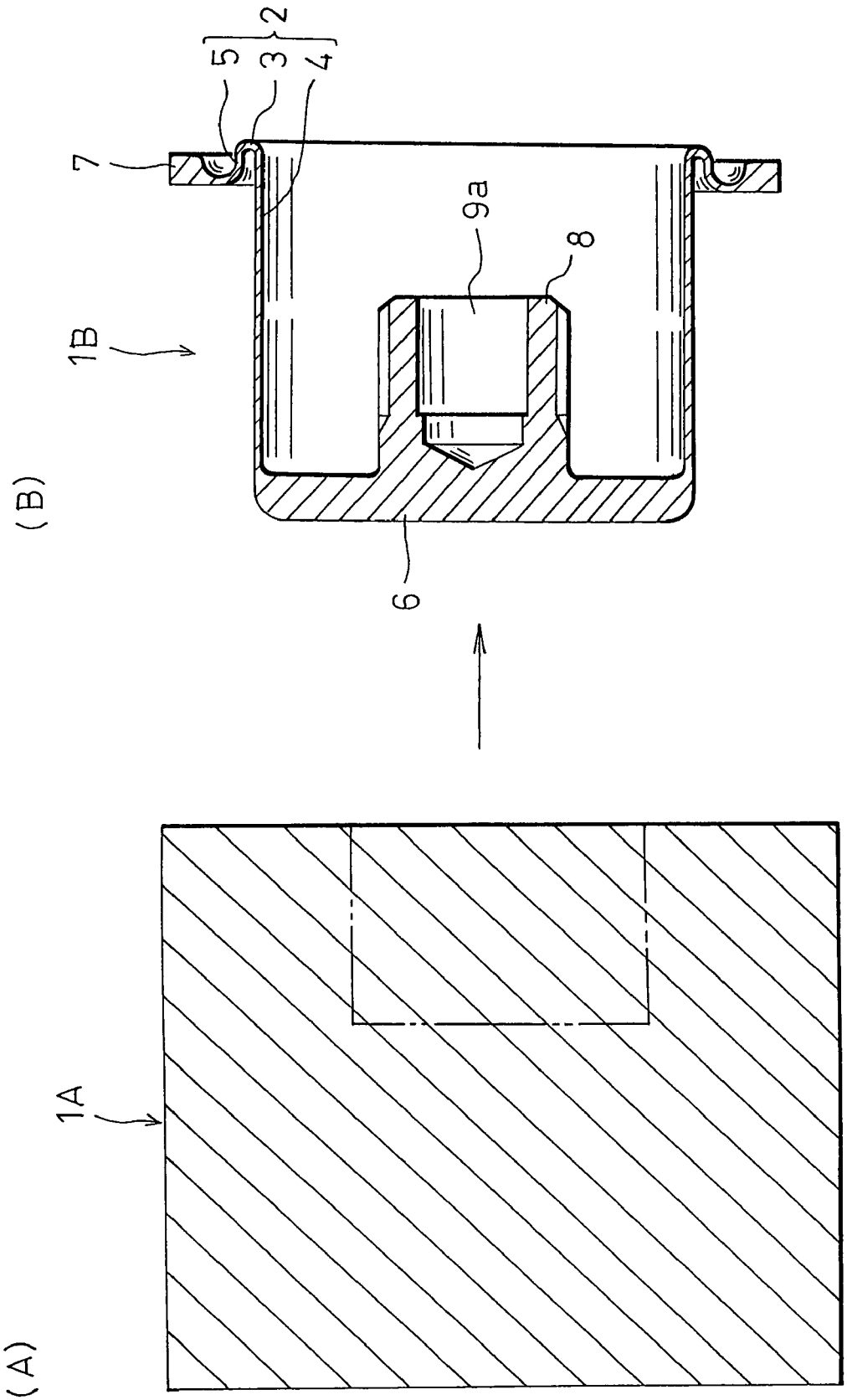
FIG. 2 is a view illustrating a method of producing the piston of the first embodiment of the invention.

FIG. 2 is a view illustrating a method of producing the piston of the first embodiment. When the piston 1 is to be produced, a workpiece 1A which is shown in (A) of FIG. 2, and which is made of a fluororesin such as PTFE is prepared. In the illustrated example, the workpiece 1A has a columnar external shape which is slightly larger than the piston 1. Alternatively, the workpiece may have a polygonal columnar shape. In order to reduce the material cost, a recess may be formed in a middle portion of one end face as indicated by the phantom line.

The piston 1 is produced in the following manner. The workpiece 1A is cut to be formed into the piston body 1B of the piston 1 into which the metal sleeve 9 has not yet been attached and fixed, as shown in (B) of FIG. 2. In addition to the rolling portion 2 (the folded-back portion 3, the inner peripheral portion 4, and the outer peripheral portion 5), the end plate portion 6, the flange portion 7, and the protrusion 8, a bottomed lower hole 9a for threadedly fixing the metal sleeve 9 on the same axis is formed in the protrusion 8. The metal sleeve 9 is threadedly fixed to the lower hole 9a of the piston body 1B which is obtained by the cutting process, thereby obtaining the piston 1 shown in FIG. 1.

Figure 3:
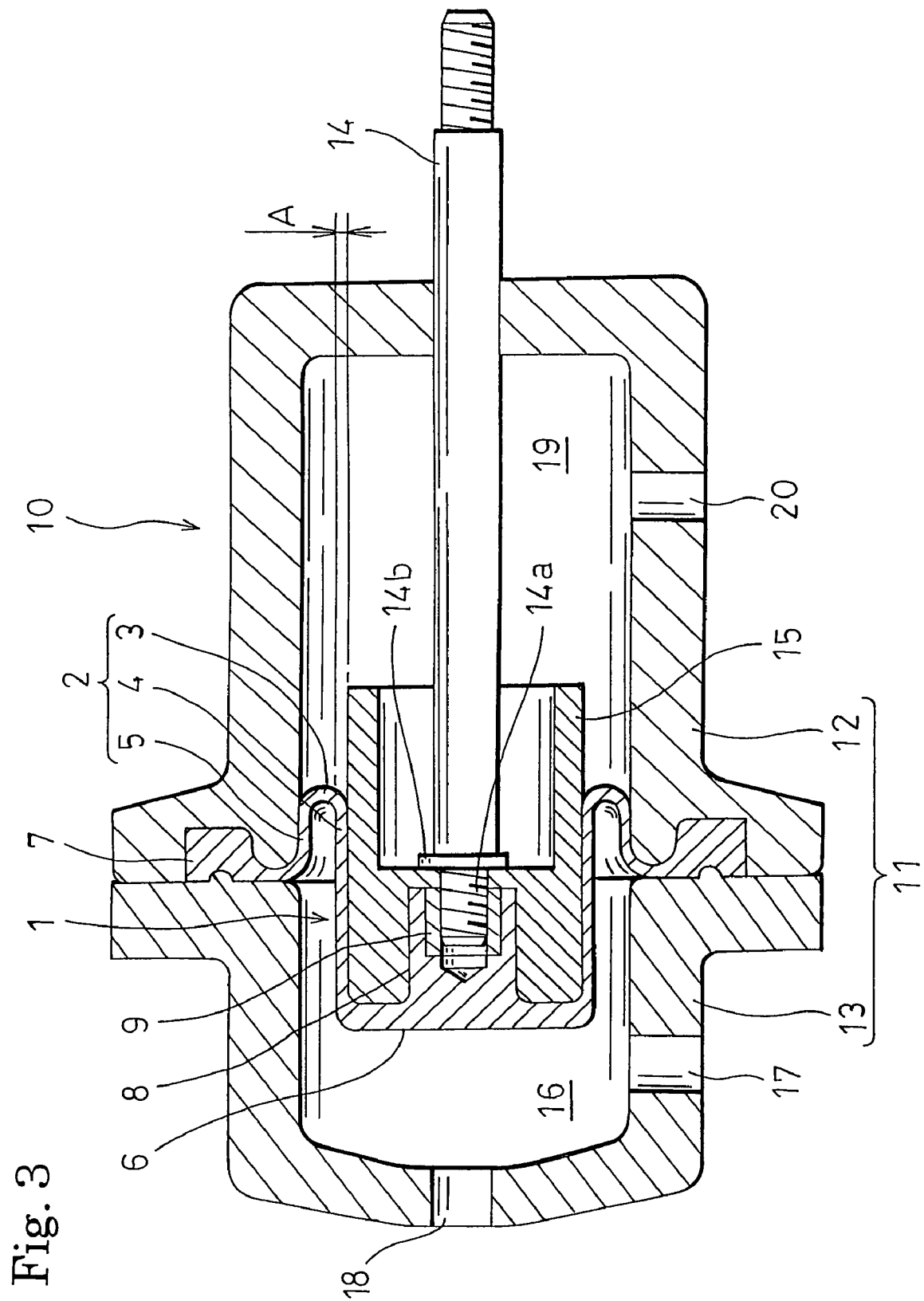
FIG. 3 is a section view of a pump comprising the piston of the first embodiment of the invention.

FIG. 3 is a section view of a pump comprising the piston of the first embodiment. The pump 10 is used for supplying quantitatively and at a constant flow rate a chemical solution such as a resist solution that is to be used in a process for producing an FPD such as an LCD, or a semiconductor device. The piston 1 is used as a diaphragm which is an operation membrane of the pump 10. In the pump 10, a cylinder 11 is configured by a cylinder body 12, and a head portion 13 which is attached to a tip end portion of the cylinder body 12. A reciprocal driving apparatus (not shown) such as a pneumatic cylinder, a liner motor, or the like is attached to the outside of the cylinder 11. To the tip end of a piston rod 14 which is reciprocally driven by the reciprocal driving apparatus in the axial direction, a piston support member 15 having a columnar external shape is attached while forming a gap between the member and the inner face of the cylinder 11. The piston support member 15 is housed and supported via the piston rod 14 in the cylinder 11 so as to be axially movable, and reciprocally driven by the reciprocal driving apparatus. The piston 1 is placed in the cylinder 11. In the piston 1, the end plate portion 6 constituting a closed end portion of the inner peripheral portion 4 is screw-coupled in the protrusion 8 to the tip end face of the piston support member 15 to be fixedly attached thereto in a closely contacted state, and the inner peripheral portion 4 extends along the outer peripheral face of the piston support member 15 from the tip end thereof toward a basal end portion of the piston support member 15, in a closely contacted state. Namely, the inner peripheral portion 4 surrounds the tip end and outer peripheral faces of the piston support member 15 in a closely contacted state. The folded-back portion 3 is on the outer peripheral face of the piston support member 15. The outer peripheral portion 5 extends along the inner peripheral face of the cylinder body 12 via the folded-back portion 3 in a closely contacted state, toward the head portion 13 of the cylinder 11 or the side in contrast to the inner peripheral portion 4. The flange portion 7 which rises from an open end portion of the outer peripheral portion 5 is clampingly held between joining faces of the cylinder body 12 and the head portion 13, to be fixedly attached to the cylinder 11. In the cylinder 11, a pressure chamber 16 is defined by the piston 1 and the head portion 13. Suction and discharge ports 17, 18 which communicate with the pressure chamber 16 are opened in the head portion 13. The suction port 17 is communicatingly connected to a liquid tank via a pipe in which a check valve or suction side air-operated valve that is not shown is disposed, and the discharge port 18 is communicatingly connected to a discharged-liquid supplying portion via a pipe in which a check valve or discharge side air-operated valve that is not shown is disposed. In the pump 10, also the head portion 13 which is a liquid-contacting portion other than the piston 1, and the like are formed by a fluororesin such as PTFE in the same manner as the piston 1.

In the cylinder 11, a negative-pressure chamber 19 is formed on the side opposite to the pressure chamber 16, by the piston 1 and the cylinder body 12. In the cylinder body 12, an air suction port 20 which communicates with the negative-pressure chamber 19 is opened. A vacuum generating apparatus which is not shown is connected to the air suction port 20. The pressure of the negative-pressure chamber 19 is maintained to be sufficiently lower than that of the pressure chamber 16, by the suction function of the vacuum generating apparatus, and used for, when the pump is driven, rolling the rolling portion 2 while displacing the folded-back portion 3 in a state where the inner and outer peripheral portions 4, 5 of the piston 1 are closely contacted with the outer peripheral face of the piston support member 15 and inner peripheral face of the cylinder 11.

In the piston rod 14, an external thread portion 14a which is integrated with one end is passed through the piston support member 15, and directly screw-coupled to the metal sleeve 9 of the piston 1, the piston support member 15 is clampingly held between the metal sleeve 9 and a collar 14b which is integrated with a basal end portion of the external thread portion 14a, and the three components, or the piston rod 14, the piston support member 15, and the piston 1 are directly coupled to one another on the same axis.

In the thus configured pump 10, the piston 1 is formed into the initial shape of the pull-type, and incorporated in the pump 10 in the initial shape. When the piston support member 15 is reciprocally driven by the reciprocal driving apparatus, therefore, the length of the inner peripheral portion 4 of the piston 1 is shortened, and that of the outer peripheral portion 5 of the piston 1 is lengthened in the suction step in which the end plate portion 6 of the piston 1 is moved integrally with the piston support member 15 from the initial position shown in FIG. 3 to the right side. In the gap between the inner peripheral face of the cylinder body 12 and the outer peripheral face of the piston support member 15, furthermore, the rolling portion 2 of the piston 1 rolls while the folded-back portion 3 of the piston 1 is displaced rightward. In accordance with the above, the volume of the pressure chamber 16 is expanded, and, during the process, the liquid such as a resist solution in the liquid tank is sucked into the pressure chamber 16. By contrast, in the discharge step in which the end plate portion 6 of the piston 1 is moved integrally with the piston support member 15 from the movement end position in the right side to the left side, to return to the initial position shown in FIG. 3, the length of the inner peripheral portion 4 of the piston 1 is lengthened, that of the outer peripheral portion 5 of the piston 1 is shortened, and, in the gap between the inner peripheral face of the cylinder body 12 and the outer peripheral face of the piston support member 15, the rolling portion 2 of the piston 1 rolls while the folded-back portion 3 of the piston 1 is displaced leftward. In accordance with the above, the volume of the pressure chamber 16 is reduced, and, during the process, the liquid in the pressure chamber 16 is supplied to the discharged-liquid supplying portion. As a result of the reciprocal driving of the piston 1, the constant amount of the liquid in the liquid tank can be supplied at the constant flow rate to the discharged-liquid supplying portion.

As described above, the piston 1 of the first embodiment is a piston which is to be movably supported in the cylinder 11 to be reciprocally driven, the piston 1 is formed by a fluororesin, the rolling portion 2 serving as a cylindrical outer peripheral portion of the piston 1 has the thickness A of 1 mm or less, and is flexible, and the rolling portion 2 has the flange portion 7 in the open end portion of the rolling portion 2 via the approximately 180-degree folded-back portion 3. The piston 1 of the first embodiment is produced by cutting the workpiece 1A made of a fluororesin. In the pump 10 comprising the piston 1 of the first embodiment, the piston 1 which is movably supported in the cylinder 11 to be reciprocally driven is formed by a fluororesin, the rolling portion 2 of the piston 1 has a thickness of 1 mm or less, and is flexible, the rolling portion 2 has the flange portion 7 in the open end portion of the rolling portion 2 via the approximately 180-degree folded-back portion 3, and the flange portion 7 is attached to the cylinder 11. In the formation of the piston 1 by a fluororesin, the rolling portion 2 of the piston 1 is set to have the thickness A of 1 mm or less, whereby the rolling portion 2 of the piston 1 can be provided with sufficient flexibility.

Therefore, the piston 1 is highly flexible, and foldable at a substantially constant curvature in the gap between the two faces or the outer face of the piston support member 15 and the inner face of the cylinder 11, and has a high bending performance. As a result, the rolling portion 2 of the piston 1 can smoothly roll without producing deflections or bends in the gap between the outer peripheral face of the piston support member 15 and the inner peripheral face of the cylinder 11, while being in close contact with the two faces. Therefore, it is possible to prevent cracks, holes, or the like from being formed in the rolling portion 2 of the piston 1, and to ensure a durability which is practically sufficient, in the piston 1 made of a fluororesin. Since deflections or bends are not produced in the rolling portion 2 of the piston 1, the constant flow rate, quantitative, and liquid displacement performances of the pump 10 can be improved, and the time of washing the pump pressure chamber 16 can be shortened. Furthermore, the piston 1 is formed into the shape in the state where the piston is set into the pump 10, and therefore the pump 10 can be assembled more easily than the case where, for example, a pump is assembled while forming the folded-back portion 3 in a piston which has been produced in a state where the folded-back portion has not yet been molded.

When the pressure chamber 16 is to be washed, the piston support member 15 is further leftward moved from the initial position shown in FIG. 3 so that the folded-back portion 3 of the piston 1 is not formed, and the end plate portion 6 of the piston 1 is separated with respect to the flange portion 7 to cause the folded-back portion 3 and the outer peripheral portion 5 not to be formed in the piston 1, whereby a portion where a liquid may stagnate is eliminated. Therefore, the liquid displacement performance can be further improved, and the washing time can be considerably shortened.

The piston rod 14 is directly coupled to the closed end portion (end plate portion 6) of the inner peripheral portion 4 of the piston 1 through the piston support member 15. Therefore, the three components, or the piston rod 14, the piston support member 15, and the piston 1 can be surely integrally coupled to one another on the same axis. As a result, uneven wear of the rolling portion 2 due to axial misalignment of the piston 1 can be prevented from occurring, and the durability (life period) of the piston 1 is improved, and hence the life period of the pump 10 can be improved.

In the first embodiment, the piston body 1B of the piston 1 is formed by cutting the workpiece 1A made of a fluororesin. Alternatively, the piston body 1B of the piston 1 may be produced by injection molding. The piston 1 may be produced by insert molding into a state where the metal sleeve 9 is integrated with the piston body 1B.

Figure 4:
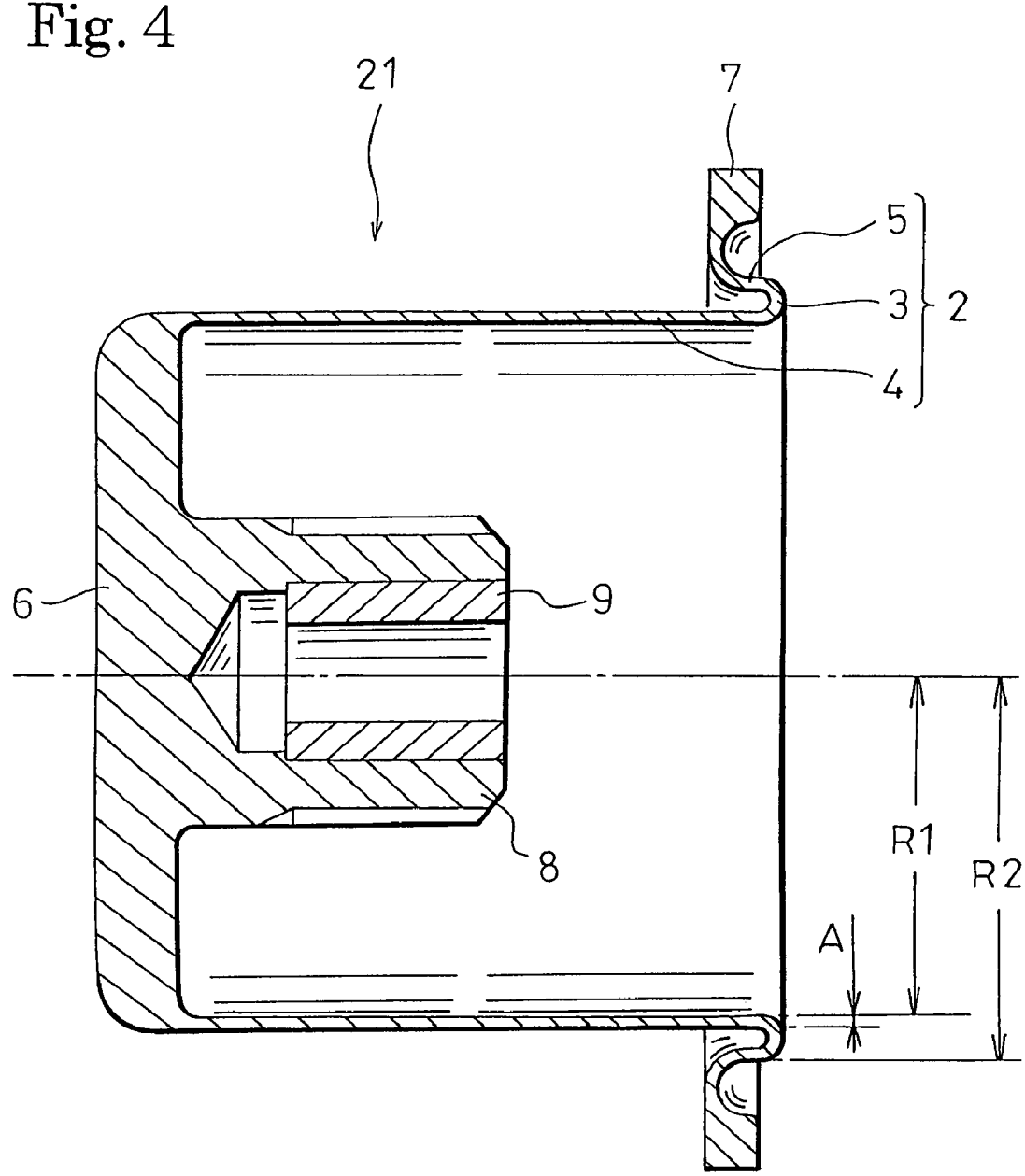
FIG. 4 is a section view showing a piston of a second embodiment of the invention.

Next, a second embodiment will be described with reference to FIGS. 4 to 6. FIG. 4 is a section view showing a piston of the second embodiment. The piston 21 is formed so that the inner diameter (R1×2) of the folded-back portion 3 is 80% or more, and less than 98% of the outer diameter (R2×2). Namely, the piston is formed so that the inner diameter (R1×2) of the rolling portion 2 is 80% or more, and less than 98% of the outer diameter (R2×2). The structure other than the above is identical with that of the piston 1 of the first embodiment. Therefore, the identical components are denoted by the same reference numerals, and their detailed description is omitted.

In the piston 21, more preferably, the ratio of the inner diameter (R1×2) of the folded-back portion 3 to the outer diameter (R2×2) (ratio of the inner diameter (R1×2) of the rolling portion 2 to the outer diameter (R2×2), hereinafter referred to as "inner/outer diameter ratio of the rolling portion 2") is 90% or more, and less than 98%.

FIG. 5 is a view illustrating a method of producing the piston of the second embodiment. When the piston 21 is to be produced, a workpiece 21A which is shown in (A) of FIG. 5, and which is made of a fluororesin such as PTFE is prepared. In the illustrated example, the workpiece 21A has a columnar external shape which is slightly larger than the piston 21. Alternatively, the workpiece may have a polygonal columnar shape. In order to reduce the material cost, a recess may be formed in a middle portion of one end face as indicated by the phantom line.

The piston 21 is produced in the following manner. The workpiece 21A is cut to be formed into the piston body 21B of the piston 21 into which the metal sleeve 9 has not yet been fixed, as shown in (B) of FIG. 5. In the piston body 21B, in addition to the rolling portion 2 (the folded-back portion 3, the inner peripheral portion 4, and the outer peripheral portion 5), the end plate portion 6, the flange portion 7, and the protrusion 8, a bottomed lower hole 29a for threadedly fixing the metal sleeve 9 on the same axis is formed in the protrusion 8. The metal sleeve 9 is threadedly fixed to the lower hole 29a of the piston body 21B which is obtained by the cutting process, thereby obtaining the piston 21 shown in FIG. 4.

Figure 6:
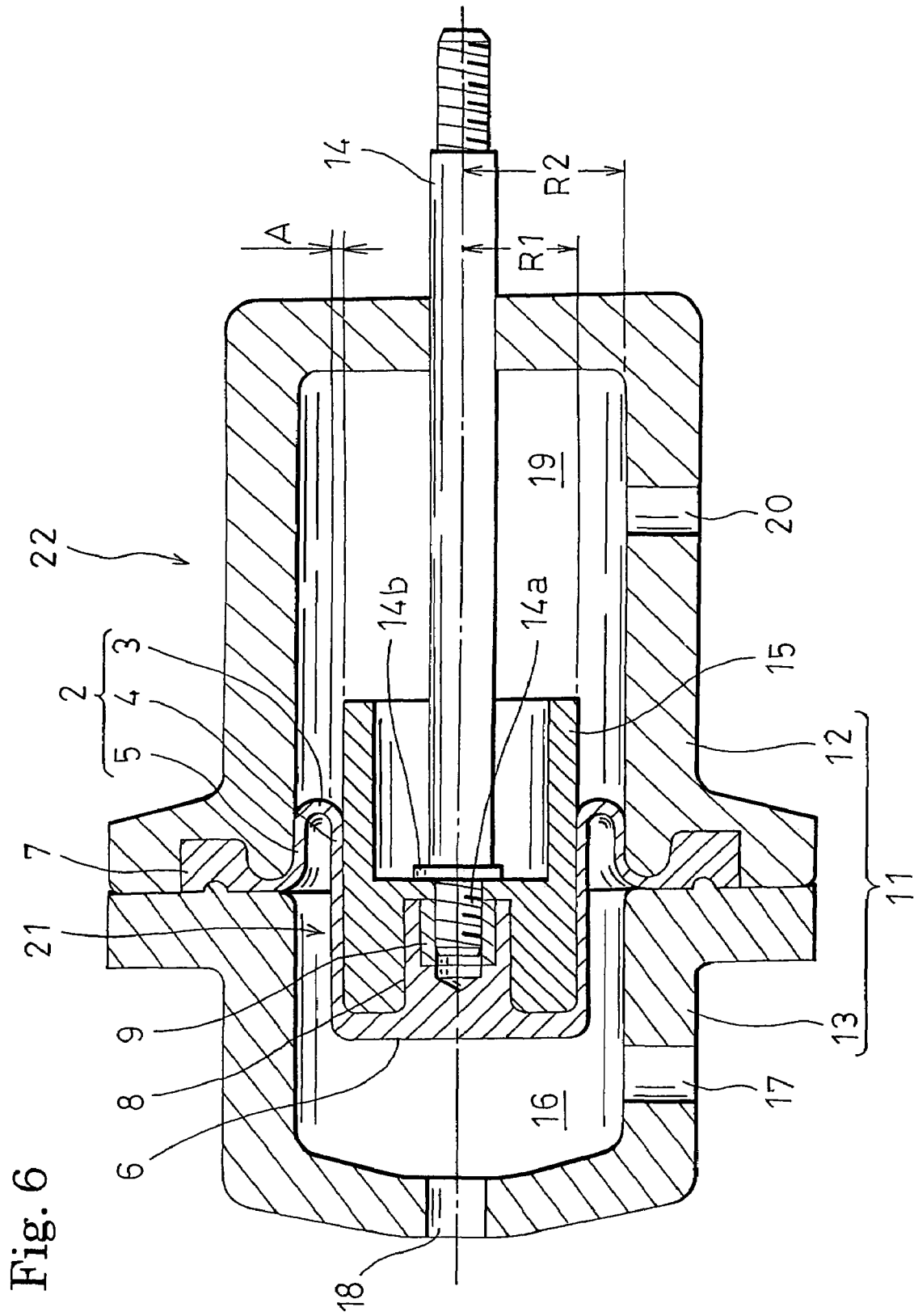
FIG. 6 is a section view of a pump comprising the piston of the second embodiment of the invention.

FIG. 6 is a section view of a pump comprising the piston of the second embodiment. The pump 22 is used for supplying quantitatively and at a constant flow rate a chemical solution such as a resist solution that is to be used in a process for producing an FPD such as an LCD, or a semiconductor device. The piston 21 is used as a diaphragm which is an operation membrane of the pump 22. The structure and operation other than the above are identical with those of the pump 10 of the first embodiment. Therefore, the identical components are denoted by the same reference numerals, and their detailed description is omitted.

As described above, the piston 21 of the second embodiment of the invention is a piston which is to be movably supported in the cylinder 11 to be reciprocally driven, and has a configuration in which the piston 21 is formed by a fluororesin, the rolling portion 2 serving as a cylindrical outer peripheral portion of the piston 21 has the thickness A of 1 mm or less, and is flexible, and the rolling portion 2 has the flange portion 7 in the open end portion of the rolling portion 2 via the approximately 180-degree folded-back portion 3. To the above configuration, the configuration where the inner/outer diameter ratio of the rolling portion 2 is 80% or more, and less than 98% is added. The piston 21 of the second embodiment is produced by cutting the workpiece 21A made of a fluororesin. In the pump 22 comprising the piston 21 of the second embodiment, the piston 21 which is movably supported in the cylinder 11 to be reciprocally driven is formed by a fluororesin, the rolling portion 2 of the piston 21 has a thickness of 1 mm or less, and is flexible, the inner/outer diameter ratio of the rolling portion 2 is 80% or more, and less than 98%, the rolling portion 2 has the flange portion 7 in the open end portion of the rolling portion 2 via the approximately 180-degree folded-back portion 3, and the flange portion 7 is attached to the cylinder 11. When the inner/outer diameter ratio of the rolling portion 2 is large, the curvature of the folded-back portion 3 is small, and a possibility that the folded-back portion 3 buckles is increased. However, the amount of distortion (amount of elongation) is reduced. By contrast, when the inner/outer diameter ratio of the rolling portion 2 is small, the curvature of the folded-back portion 3 is large, and the possibility that the folded-back portion 3 buckles is reduced. However, the amount of distortion (amount of elongation) is increased. When the amount of distortion (amount of elongation) is large, the rolling portion 2 is plastically deformed, and deflections or bends are produced in the rolling portion 2, so that the shape is uneven and the constant flow rate performance of the pump 22 is lowered. When the inner/outer diameter ratio of the rolling portion 2 is increased to 80% or more, preferably 90% or more, the amount of distortion (amount of elongation) of the folded-back portion 3 is reduced, and it is possible to prevent the rolling portion 2 of the piston 21 from being plastically deformed, so that the shape of the rolling portion 2 of the piston 21 is made even while preventing deflections or bends from occurring. As a result, the rolling portion 2 of the piston 21 can smoothly roll without producing deflections or bends in the gap between the outer peripheral face of the piston support member 15 and the inner peripheral face of the cylinder 11, while being surely in close contact with the two faces. Therefore, the embodiment can exert an excellent effect on improvement of the constant flow rate performance of the pump 22. Consequently, the constant flow rate performance of the pump 22 which can be applied also to a process for producing an FPD such as an LCD can be obtained. The folded-back portion 3 can be prevented from buckling, by setting the inner/outer diameter ratio of the rolling portion 2 to be smaller than 98%.

Figure 7:
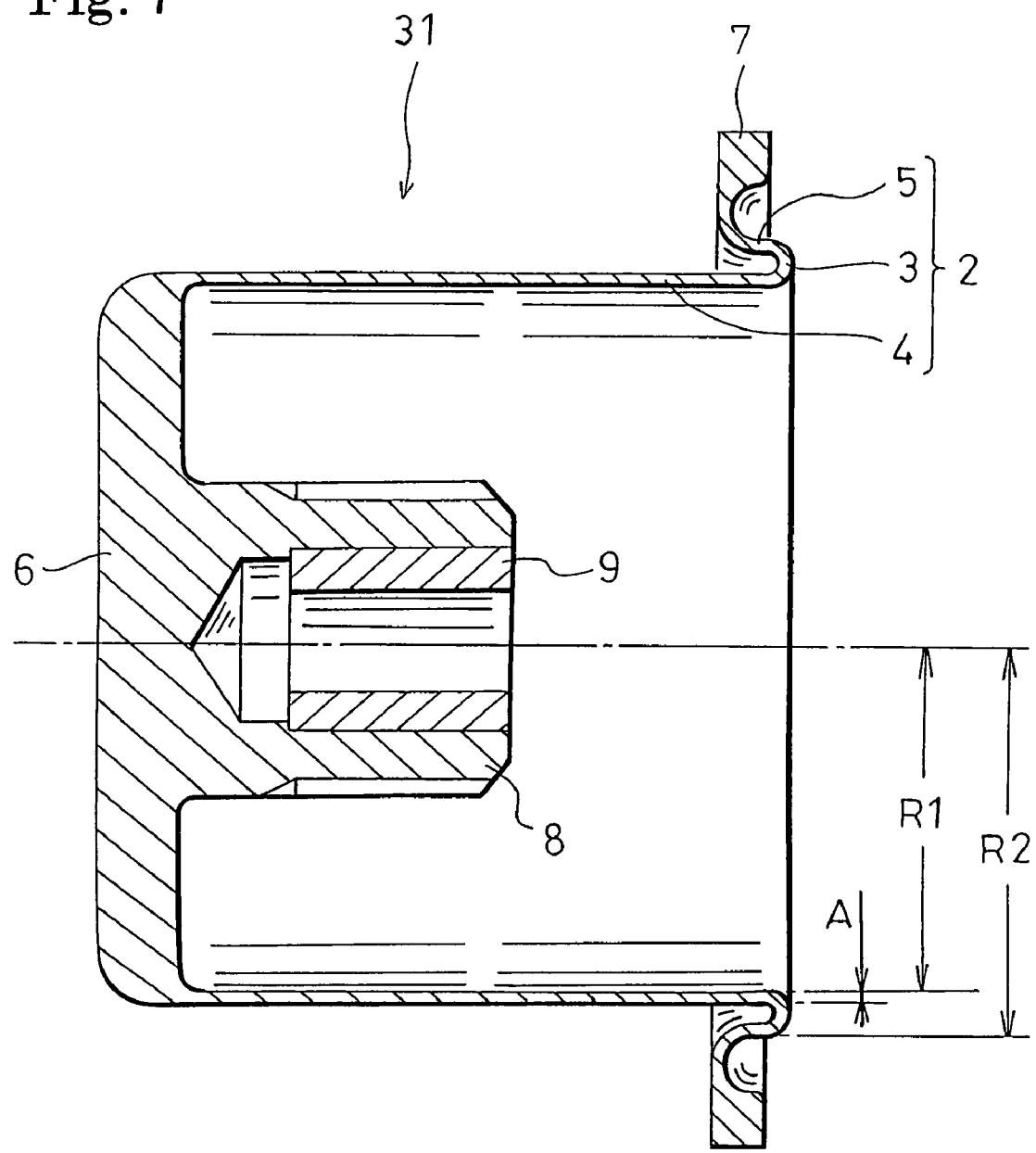
FIG. 7 is a section view showing a piston of a third embodiment of the invention.

Next, a third embodiment of the invention will be described with reference to FIGS. 7 to 10. FIG. 7 is a section view showing a piston of the third embodiment. The piston 31 is different only in production method from the piston 21 of the second embodiment, but identical in structure with the piston 21 of the second embodiment. Therefore, the identical components are denoted by the same reference numerals, and their detailed description is omitted.

Figure 8:
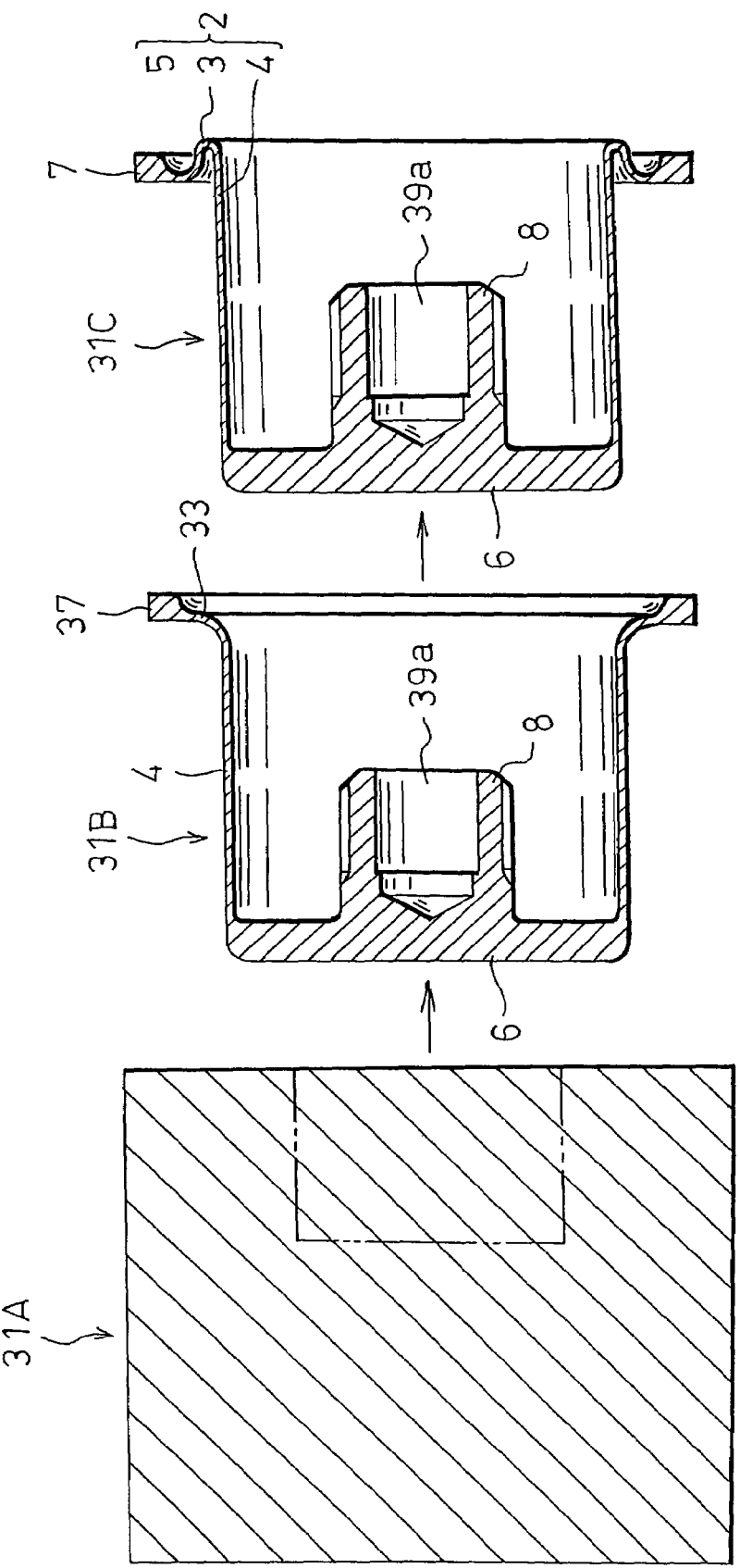
FIG. 8 is a view illustrating a method of producing the piston of the third embodiment of the invention.
Figure 9:
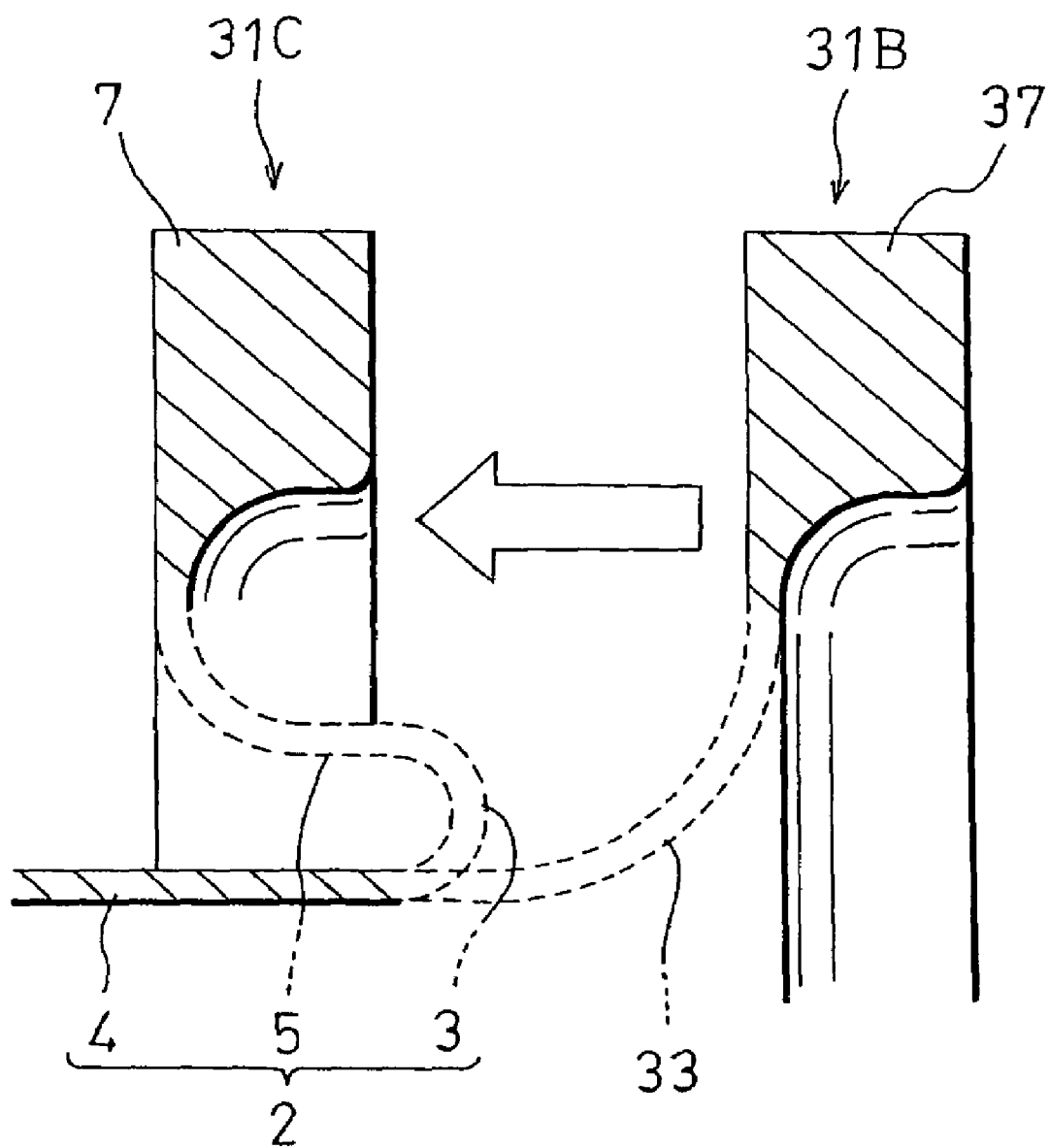
FIG. 9 is a diagram showing an example of a step of forming a folded-back portion in the method of producing the piston of the third embodiment of the invention.

FIG. 8 is a view illustrating a method of producing the piston of the third embodiment, and FIG. 9 is a diagram showing an example of a step of forming the folded-back portion in the method of producing the piston of the third embodiment. When the piston 31 is to be produced, a workpiece 31A which is shown in (A) of FIG. 8, and which is made of a fluororesin such as PTFE is prepared. In the illustrated example, the workpiece 31A has a columnar external shape which is slightly larger than the piston 31. Alternatively, the workpiece may have a polygonal columnar shape. In order to reduce the material cost, a recess may be formed in a middle portion of one end face as indicated by the phantom line.

The piston 31 is produced in the following manner. The workpiece 31A is cut to be molded into a piston semifinished product 31B (a semifinished product of the piston body) which is shown in (B) of FIG. 8, and in which the folded-back portion 3 of the piston 31 has not yet been molded. By the cutting process (primary process), the product shapes of the inner peripheral portion 4, end plate portion 6, and protrusion 8 of the piston 31 are obtained, and, as shown also in FIG. 9, a to-be-folded portion 33 which will be formed as the folded-back portion 3 and outer peripheral portion 5 of the piston 31 is molded continuously integrally with the open end portion of the inner peripheral portion 4. The to-be-folded portion 33 is molded into an L-like section shape in which the tip end side is bent radially outward by a bending angle of about 90 degrees with a predetermined bend radius, and the length is equal to a sum of the lengths of the folded-back portion 3 and outer peripheral portion 5 of the piston 31 (see the broken lines of FIG. 9). An end flange portion 37 which will be formed as the flange portion 7 of the piston 31 is molded continuously integrally with a tip end portion of the to-be-folded portion 33. In the same manner as the flange portion 7 of the piston 1, the end flange portion 37 is molded into an annular plate member which perpendicularly rises from the end portion of the to-be-folded portion 33 toward the radially outward side, and in which both the flat principal faces are directed in the axial direction. A bottomed lower hole 39a for threadedly fixing the metal sleeve 9 on the same axis is formed in the protrusion 8.

As described above, in addition to the inner peripheral portion 4, end plate portion 6, and protrusion 8 of the piston 31, the piston semifinished product 31B has: the to-be-folded portion 33 which will be formed as the folded-back portion 3 and outer peripheral portion 5 of the piston 31; the end flange portion 37 which will be formed as the flange portion 7 of the piston 31; and the bottomed lower hole 39a for attaching the metal sleeve 9. The piston semifinished product is molded into the shape in which the flange portion 7 is separated from the end plate portion 6 to cause the folded-back portion 3 of the piston 31 not to be formed, and the product shape of the rolling portion 2 of the piston 31 has not yet been molded.

Next, a secondary process for forming the folded-back portion 3 is applied on the to-be-folded portion 33 of the piston semifinished product 31B. In the secondary process, for example, the folded-back portion 3 is formed by one of: shaping by a thermal process such as a process for bending the to-be-folded portion 33 along a bending tool while heating the to-be-folded portion 33; shaping by a pressing process such as a process in which the to-be-folded portion 33 is clamped by a pair of bending dies; and shaping by a combination of a thermal process and a pressing process, such as a process in which the to-be-folded portion 33 is clamped by a pair of bending dies while heating the to-be-folded portion 33. By the secondary process, as shown in (C) of FIG. 8, the piston body 31C of the piston 31 into which the metal sleeve 9 has not yet been attached and fixed is formed. In the piston body 31C, by the secondary process applied to the piston semifinished product 31B, the folded-back portion 3, outer peripheral portion 5, and flange portion 7 of the piston 31 are additionally formed, and the rolling portion 2, the end plate portion 6, the flange portion 7, the protrusion 8, and the lower hole 39a are formed. The metal sleeve 9 is threadedly fixed to the lower hole 39a of the piston body 31C which is obtained by the secondary process, thereby obtaining the piston 31 shown in FIG. 7.

Figure 10:
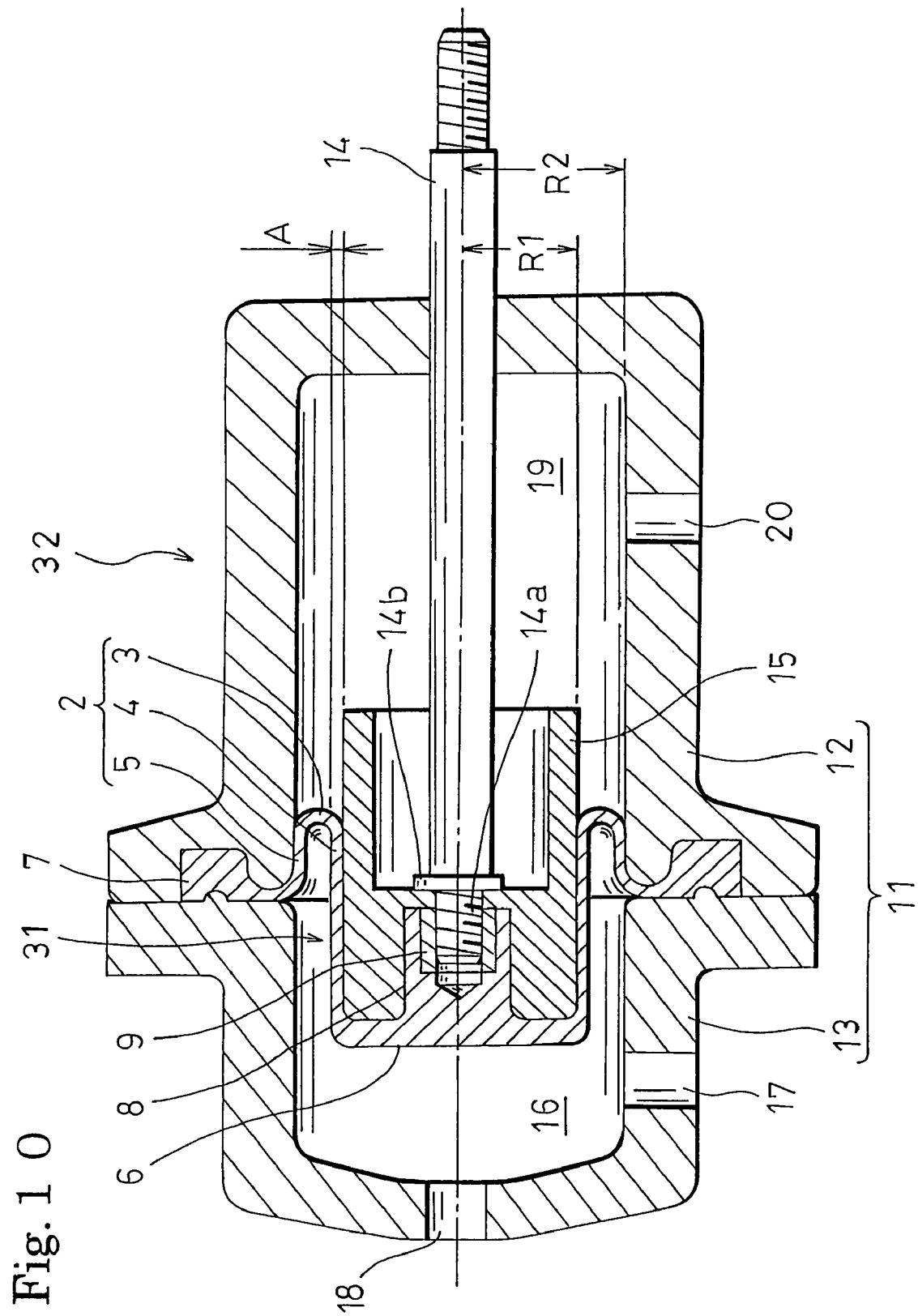
FIG. 10 is a section view of a pump comprising the piston of the third embodiment of the invention.

FIG. 10 is a section view of a pump comprising the piston of the third embodiment. The pump 32 is used for supplying quantitatively and at a constant flow rate a chemical solution such as a resist solution that is to be used in a process for producing an FPD such as an LCD, or a semiconductor device. The piston 31 is used as a diaphragm which is an operation membrane of the pump 32. The structure and operation other than the above are identical with those of the pump 10 of the first embodiment. Therefore, the identical components are denoted by the same reference numerals, and their detailed description is omitted.

As described above, the piston 31 of the third embodiment is a piston which is to be movably supported in the cylinder 11 to be reciprocally driven, and has a configuration in which the piston 31 is formed by a fluororesin, the rolling portion 2 serving as a cylindrical outer peripheral portion of the piston 31 has the thickness A of 1 mm or less, and is flexible, the inner/outer diameter ratio of the rolling portion 2 is 80% or more, and less than 98%, and the rolling portion 2 has the flange portion 7 in the open end portion of the rolling portion 2 via the approximately 180-degree folded-back portion 3. To the above configuration, the configuration where the piston body 31C of the piston 31 is formed by the secondary process which is applied to the piston semifinished product 31B after the workpiece 31A made of a fluororesin is cut to form the piston semifinished product 31B is added. The piston 31 of the third embodiment is produced by cutting the workpiece 31A made of a fluororesin to mold the piston semifinished product 31B in which the folded-back portion 3 has not yet been molded, and thereafter forming the folded-back portion 3 by the secondary process which is applied to the piston semifinished product 31B. In the pump 32 comprising the piston 31 of the third embodiment, the piston 31 which is movably supported in the cylinder 11 to be reciprocally driven is formed by a fluororesin, the rolling portion 2 of the piston 31 has a thickness of 1 mm or less, and is flexible, the inner/outer diameter ratio of the rolling portion 2 is 80% or more, and less than 98%, the rolling portion 2 has the flange portion 7 in the open end portion of the rolling portion 2 via the approximately 180-degree folded-back portion 3, and the flange portion 7 is attached to the cylinder 11. In contrast to the fluororesin-made pistons 1, 21 of the first and second embodiments in which the folded-back portion 3 is molded during the molding of the piston (molding of the piston body), in the fluororesin-made piston 31 of the third embodiment, the folded-back portion 3 is formed by the secondary process which, after the piston semifinished product 31B in which the folded-back portion 3 has not yet been molded is molded, is applied to the semifinished product, such as shaping by a thermal process or a pressing process. Therefore, the shape of the folded-back portion 3 is simplified, and the cutting process for molding the piston semifinished product 31B can be easily performed. In the case of the fluororesin-made pistons 1, 21 of the first and second embodiments in which the folded-back portion 3 is molded during the molding of the piston (molding of the piston body), when the pump is driven, the folded-back portion 3 which is formed during the molding is displaced from the position at the molding to the inner peripheral face of the cylinder 11 or the outer peripheral face of the piston support member 15 in a state where the initial shape in the molding remains, to rub against the inner peripheral face of the cylinder 11 or the outer peripheral face of the piston support member 15, and the folded-back portion which is formed during the molding is worn. The wear also lowers the durability of the piston, and produces deflections or bends in the inner peripheral face of the cylinder 11 or the outer peripheral face of the piston support member 15 and in the vicinity of the displaced folded-back portion which is formed during the molding. The deflections or bends cause possibilities in that the constant flow rate, quantitative, and liquid displacement performances of the pump are lowered, and that the time of washing the pump pressure chamber 16 is prolonged. By contrast, in the fluororesin-made piston 31 of the third embodiment, the folded-back portion 3 is formed by the secondary process which, after the piston semifinished product 31B in which the folded-back portion 3 has not yet been molded is molded, is applied to the semifinished product, such as shaping by a thermal process or a pressing process. Even when, in driving of the pump, the folded-back portion 3 is displaced from the initial position in the formation to the inner peripheral face of the cylinder 11 or the outer peripheral face of the piston support member 15, therefore, the initial shape in the formation does not remain, and the folded-back portion can be closely contacted with the inner peripheral face of the cylinder 11 and the outer peripheral face of the piston support member 15. As a result, the rolling portion 2 of the piston 31 can smoothly roll without producing deflections or bends in the gap between the outer peripheral face of the piston support member 15 and the inner peripheral face of the cylinder 11, while being surely in close contact with the two faces. Therefore, it is possible to prevent cracks, holes, or the like from being formed in the piston 31, and to ensure a durability which is practically sufficient, in the piston 31 made of a fluororesin. Since deflections or bends are not produced in the rolling portion 2 of the piston 31, the constant flow rate, quantitative, and liquid displacement performances of the pump 32 can be improved, and the time of washing the pump pressure chamber 16 can be shortened. Furthermore, the piston 31 is formed into the shape in the state where the piston is set into the pump 32, and therefore the pump 32 can be assembled more easily than the case where, for example, a pump is assembled while forming the folded-back portion 3 in a piston which has been produced in a state where the folded-back portion has not yet been molded.

Figure 11:
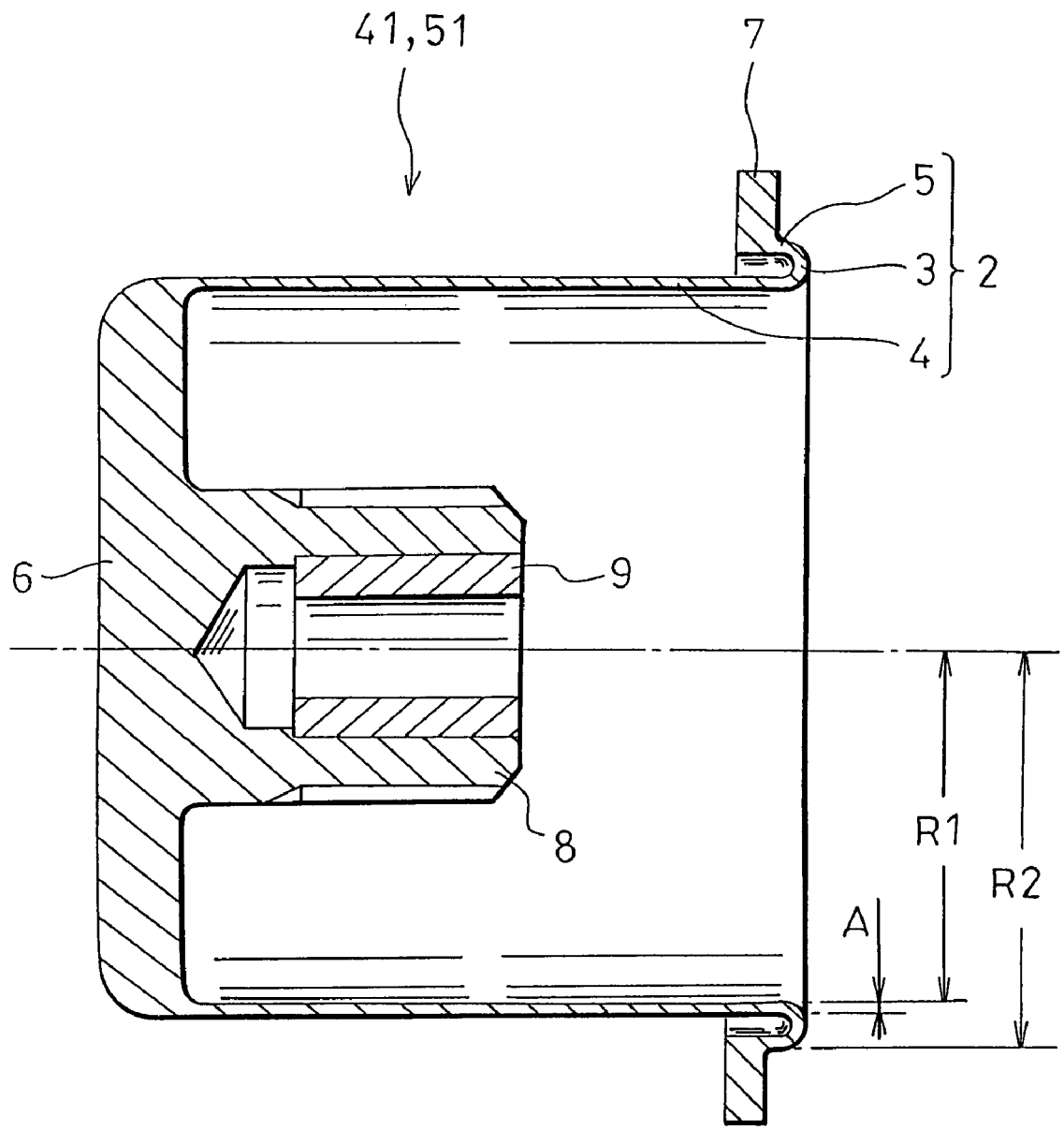
FIG. 11 is a section view showing pistons of fourth and fifth embodiments of the invention.

Next, fourth and fifth embodiments of the invention will be described with reference to FIGS. 11 to 16. A piston 41 of the fourth embodiment and a piston 51 of the fifth embodiment are different from each other only in production method, but identical in structure with each other. FIG. 11 is a section view showing the pistons of the fourth and fifth embodiments. The pistons 41, 51 of the fourth and fifth embodiments are different only in production method from the pistons 21, 31 of the second and third embodiments, but identical in structure with the pistons 21, 31 of the second and third embodiments. Therefore, the identical components are denoted by the same reference numerals, and their detailed description is omitted.

Figure 12:
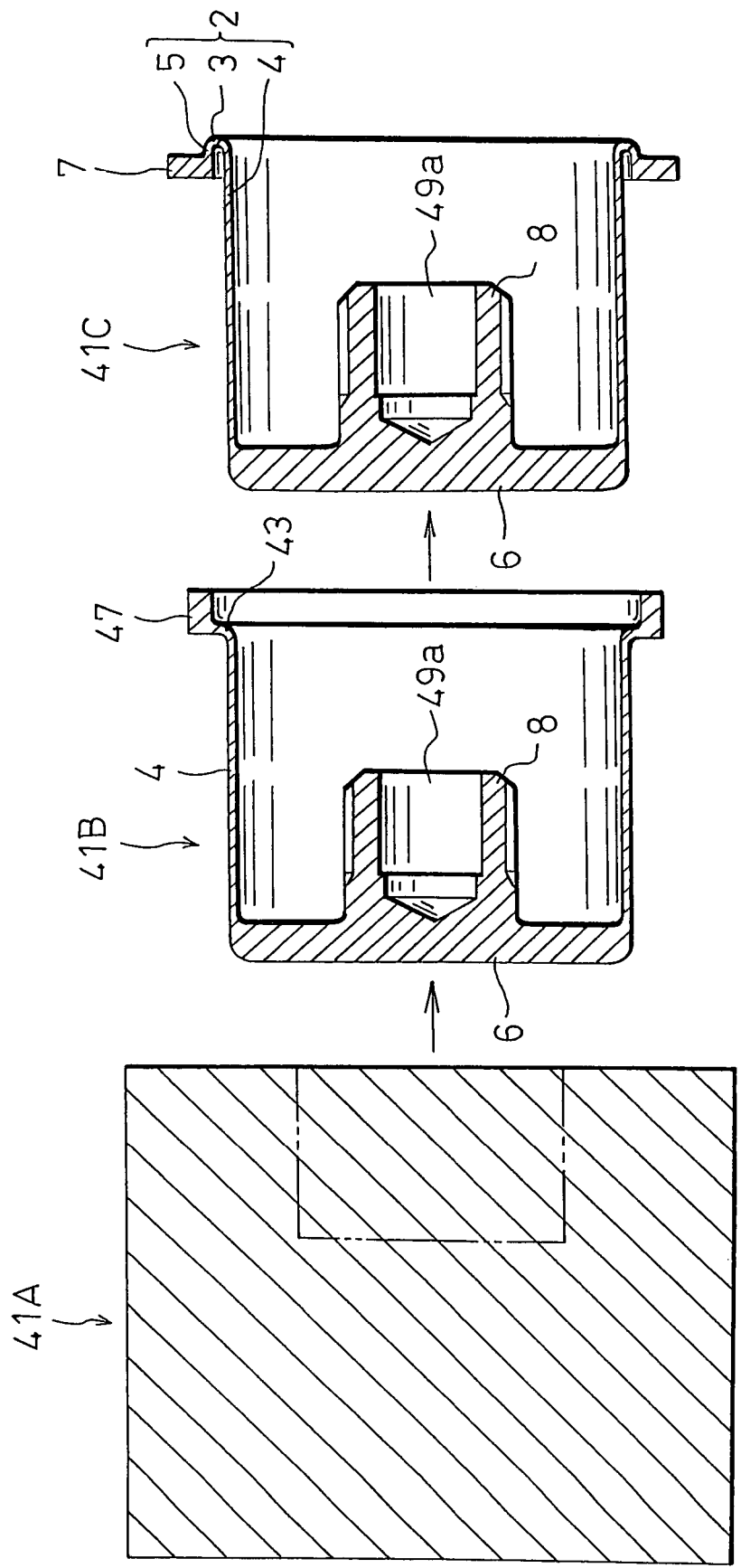
FIG. 12 is a view illustrating a method of producing the piston of the fourth embodiment of the invention.
Figure 13:
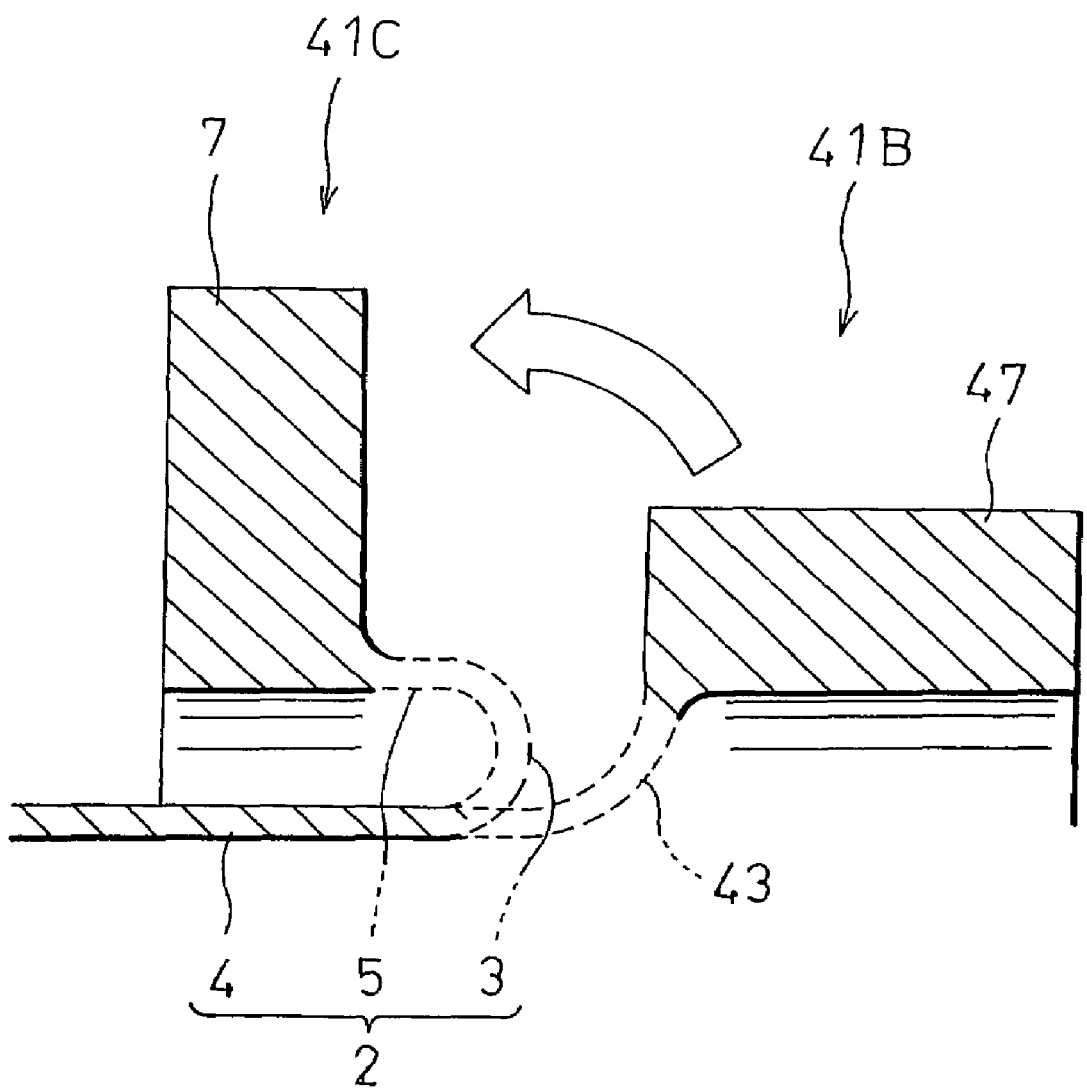
FIG. 13 is a diagram showing an example of a step of forming a folded-back portion in the method of producing the piston of the fourth embodiment of the invention.

FIG. 12 is a view illustrating a method of producing the piston of the fourth embodiment, and FIG. 13 is a diagram showing an example of a step of forming a folded-back portion in the method of producing the piston of the fourth embodiment. When the piston 41 is to be produced, a workpiece 41A which is shown in (A) of FIG. 12, and which is made of a fluororesin such as PTFE is prepared. In the illustrated example, the workpiece 41A has a columnar external shape which is slightly larger than the piston 41. Alternatively, the workpiece may have a polygonal columnar shape. In order to reduce the material cost, a recess may be formed in a middle portion of one end face as indicated by the phantom line.

The piston 41 is produced in the following manner. The workpiece 41A is cut to be molded into a piston semifinished product 41B (a semifinished product of the piston body) which is shown in (B) of FIG. 12, and in which the folded-back portion 3 of the piston 41 has not yet been molded. By the cutting process (primary process), the product shapes of the inner peripheral portion 4, end plate portion 6, and protrusion 8 of the piston 41 are obtained, and, as shown also in FIG. 13, a to-be-folded portion 43 which will be formed as the folded-back portion 3 and outer peripheral portion 5 of the piston 41 is molded continuously integrally with the open end portion of the inner peripheral portion 4. The to-be-folded portion 43 is molded into an L-like section shape in which the tip end side is bent radially outward by a bending angle of about 90 degrees with a predetermined bend radius, and the length is equal to a sum of the lengths of the folded-back portion 3 and outer peripheral portion 5 of the piston 41 (see the broken lines of FIG. 13). A bent flange portion 47 which will be formed as the flange portion 7 of the piston 41 is molded continuously integrally with a tip end portion of the to-be-folded portion 43. The bent flange portion 47 is formed into an annular shape which is protruded from the tip end portion of the to-be-folded portion 43 along the axis toward the side opposite to the inner peripheral portion 4, and in which both the principal faces that are circularly bent are directed in a radial direction. A bottomed lower hole 49a for threadedly fixing the metal sleeve 9 on the same axis is formed in the protrusion 8.

As described above, in addition to the inner peripheral portion 4, end plate portion 6, and protrusion 8 of the piston 41, the piston semifinished product 41B has: the to-be-folded portion 43 which will be formed as the folded-back portion 3 and outer peripheral portion 5 of the piston 41; the bent flange portion 47 which will be formed as the flange portion 7 of the piston 41; and the bottomed lower hole 49a for attaching the metal sleeve 9. The piston semifinished product is molded into the shape in which the folded-back portion 3 of the piston 41 is bent back by about 90 degrees, and the product shape of the rolling portion 2 of the piston 41 has not yet been molded.

Next, a secondary process for forming the folded-back portion 3 is applied on the to-be-folded portion 43 of the piston semifinished product 41B. In the secondary process, for example, the folded-back portion 3 is formed by one of: shaping by a thermal process such as a process for bending the to-be-folded portion 43 along a bending tool while heating the to-be-folded portion 43; shaping by a pressing process such as a process in which the to-be-folded portion 43 is clamped by a pair of bending dies; and shaping by a combination of a thermal process and a pressing process, such as a process in which the to-be-folded portion 43 is clamped by a pair of bending dies while heating the to-be-folded portion 43. By the secondary process, as shown in (C) of FIG. 12, the piston body 41C of the piston 41 into which the metal sleeve 9 has not yet been attached and fixed is formed. In the piston body 41C, by the secondary process applied to the piston semifinished product 41B, the folded-back portion 3, outer peripheral portion 5, and flange portion 7 of the piston 41 are additionally formed, and the rolling portion 2, the end plate portion 6, the flange portion 7, the protrusion 8, and the lower hole 49a are formed. The metal sleeve 9 is threadedly fixed to the lower hole 49a of the piston body 41C which is obtained by the secondary process, thereby obtaining the piston 41 shown in FIG. 11.

Figure 14:
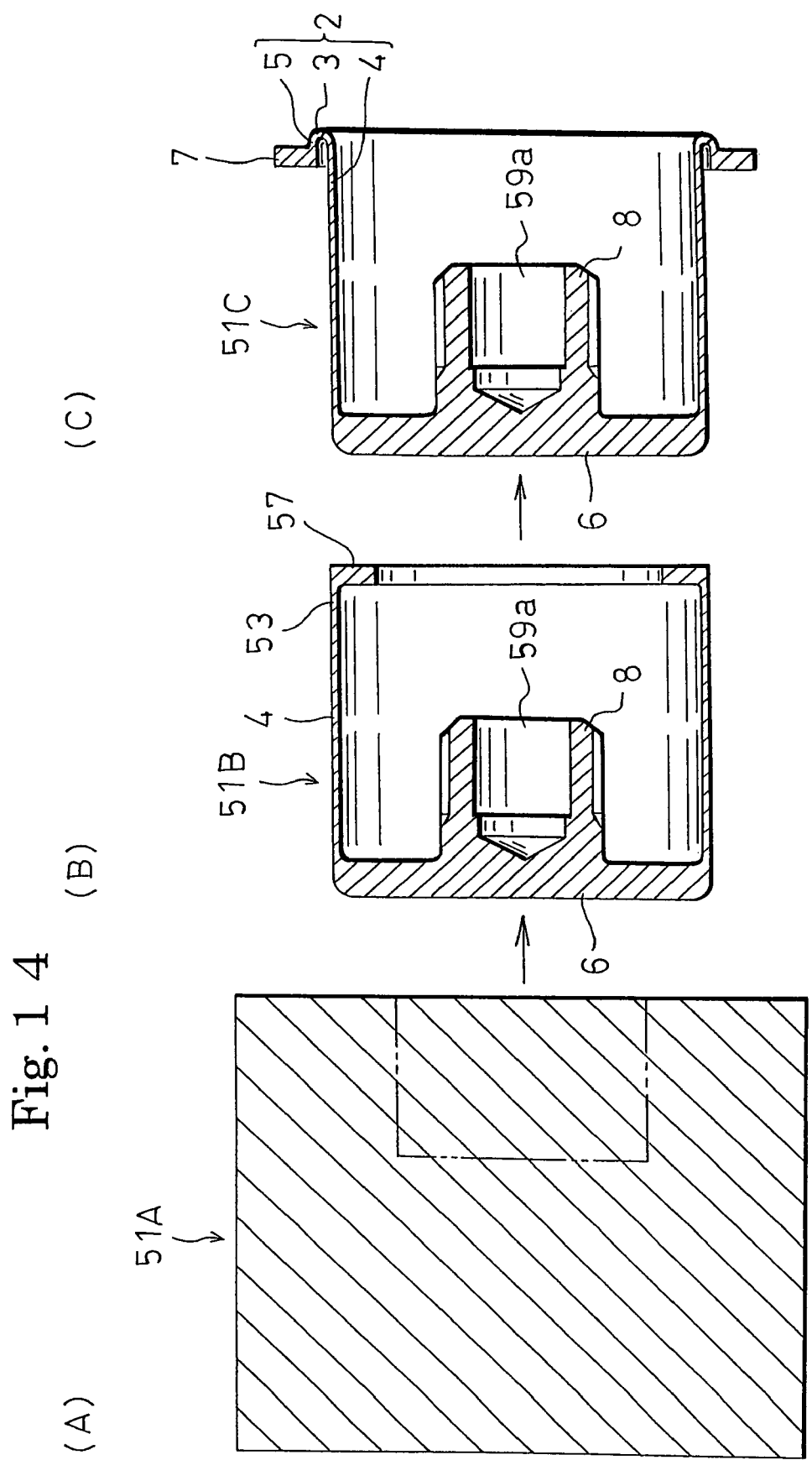
FIG. 14 is a view illustrating a method of producing the piston of the fifth embodiment of the invention.
Figure 15:
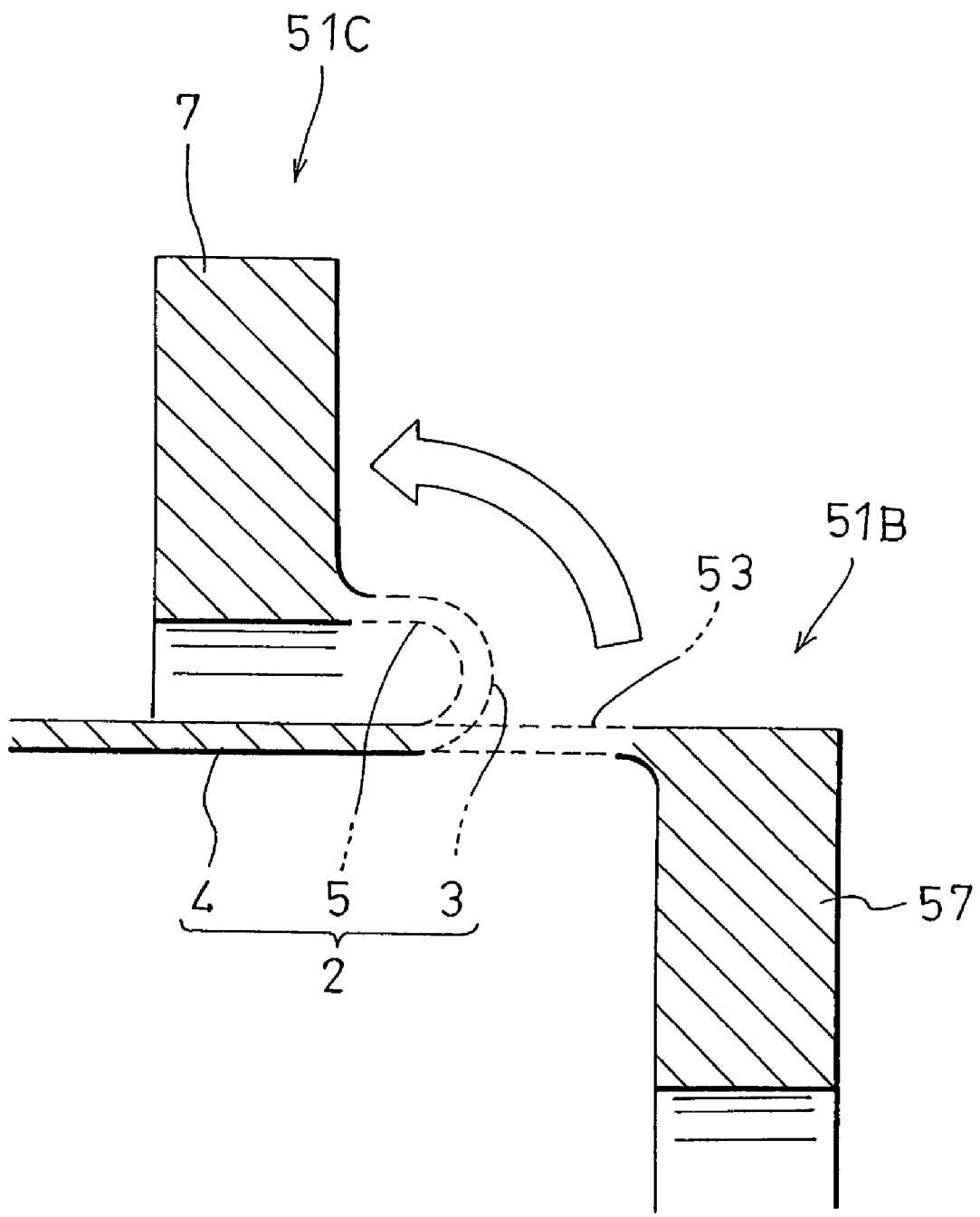
FIG. 15 is a diagram showing an example of a step of forming a folded-back portion in the method of producing the piston of the fifth embodiment of the invention.

FIG. 14 is a view illustrating a method of producing the piston of the fifth embodiment of the invention, and FIG. 15 is a diagram showing an example of a step of forming the folded-back portion in the method of producing the piston of the fifth embodiment. When the piston 51 is to be produced, a workpiece 51A which is shown in (A) of FIG. 14, and which is made of a fluororesin such as PTFE is prepared. In the illustrated example, the workpiece 51A has a columnar external shape which is slightly larger than the piston 51. Alternatively, the workpiece may have a polygonal columnar shape. In order to reduce the material cost, a recess may be formed in a middle portion of one end face as indicated by the phantom line.

The piston 51 is produced in the following manner. The workpiece 51A is cut to be molded into a piston semifinished product 51B (a semifinished product of the piston body) which is shown in (B) of FIG. 14, and in which the folded-back portion 3 of the piston 51 has not yet been molded. By the cutting process (primary process), the product shapes of the inner peripheral portion 4, end plate portion 6, and protrusion 8 of the piston 51 are obtained, and, as shown also in FIG. 15, a to-be-folded portion 53 which will be formed as the folded-back portion 3 and outer peripheral portion 5 of the piston 51 is molded continuously integrally with the open end portion of the inner peripheral portion 4. The to-be-folded portion 53 straightly extends from the open end portion of the inner peripheral portion 4 to be molded into a cylindrical shape, and the length is equal to a sum of the lengths of the folded-back portion 3 and outer peripheral portion 5 of the piston 51 (see the broken lines of FIG. 15). An inverted flange portion 57 which will be formed as the flange portion 7 of the piston 51 is molded continuously integrally with a tip end portion of the to-be-folded portion 53. In a tip end portion of the to-be-folded portion 53, the inverted flange portion 57 is molded into an annular plate member which substantially perpendicularly rises from a tip end portion of the to-be-folded portion 53 toward the radially inward side, and in which both the flat principal faces are directed in the axial direction. A bottomed lower hole 59a for threadedly fixing the metal sleeve 9 on the same axis is formed in the protrusion 8.

As described above, in addition to the inner peripheral portion 4, end plate portion 6, and protrusion 8 of the piston 51, the piston semifinished product 51B has: the to-be-folded portion 53 which will be formed as the folded-back portion 3 and outer peripheral portion 5 of the piston 51; the inverted flange portion 57 which will be formed as the flange portion 7 of the piston 51; and the bottomed lower hole 59a for attaching the metal sleeve 9. The piston semifinished product is molded into the shape in which the folded-back portion 3 of the piston 51 is bent back by about 180 degrees, and the product shape of the rolling portion 2 of the piston 51 has not yet been molded.

Next, a secondary process for forming the folded-back portion 3 is applied on the to-be-folded portion 53 of the piston semifinished product 51B. In the secondary process, for example, the folded-back portion 3 is formed by one of: shaping by a thermal process such as a process for bending the to-be-folded portion 53 along a bending tool while heating the to-be-folded portion 53; shaping by a pressing process such as a process in which the to-be-folded portion 53 is clamped by a pair of bending dies; and shaping by a combination of a thermal process and a pressing process, such as a process in which the to-be-folded portion 53 is clamped by a pair of bending dies while heating the to-be-folded portion 53. By the secondary process, as shown in (C) of FIG. 14, the piston body 51C of the piston 51 into which the metal sleeve 9 has not yet been attached and fixed is formed. In the piston body 51C, by the secondary process applied to the piston semifinished product 51B, the folded-back portion 3, outer peripheral portion 5, and flange portion 7 of the piston 51 are additionally formed, and the rolling portion 2, the end plate portion 6, the flange portion 7, the protrusion 8, and the lower hole 59a are formed. The metal sleeve 9 is threadedly fixed to the lower hole 59a of the piston body 51C which is obtained by the secondary process, thereby obtaining the piston 51 shown in FIG. 11.

In the method of producing the piston of the fourth or fifth embodiment, as apparent from the production method, in the case where the piston semifinished product 41B or 51B in a state where the folded-back portion 3 of the piston 41 or 51 is bent back is to be molded, when the band-back angle is within a range from about 90 degree to about 180 degree, the piston body 41C or 51C of the piston 41 or 51 can be properly formed by the secondary process even when the piston semifinished product has been bent back at any angle.

Figure 16:
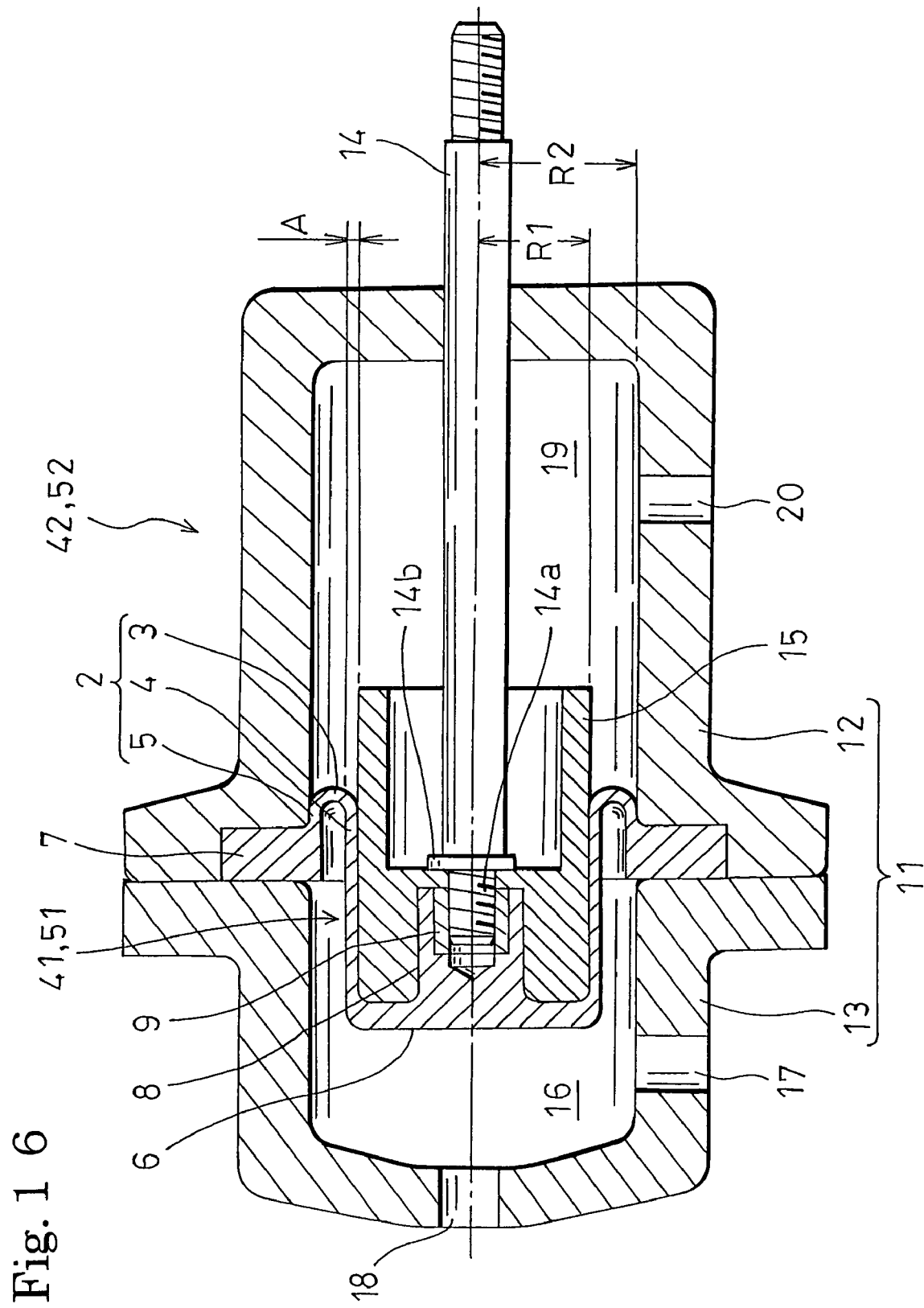
FIG. 16 is a section view of a pump comprising the piston of the fourth or fifth embodiment of the invention.

FIG. 16 is a section view of a pump comprising the piston of the fourth or fifth embodiment. The pump 42 (the pump comprising the piston of the fourth embodiment), or the pump 52 (the pump comprising the piston of the fifth embodiment) is used for supplying quantitatively and at a constant flow rate a chemical solution such as a resist solution that is to be used in a process for producing an FPD such as an LCD, or a semiconductor device. The piston 41 or 51 is used as a diaphragm which is an operation membrane of the pump 42 or 52. The structure and operation other than the above are identical with those of the pump 10 of the first embodiment. Therefore, the identical components are denoted by the same reference numerals, and their detailed description is omitted.

As described above, the piston 41 or 51 of the fourth or fifth embodiment is a piston which is to be movably supported in the cylinder 11 to be reciprocally driven, and has a configuration in which the piston 41 or 51 is formed by a fluororesin, the rolling portion 2 serving as a cylindrical outer peripheral portion of the piston 41 or 51 has the thickness A of 1 mm or less, and is flexible, the inner/outer diameter ratio of the rolling portion 2 is 80% or more, and less than 98%, and the rolling portion 2 has the flange portion 7 in the open end portion of the rolling portion 2 via the approximately 180-degree folded-back portion 3. To the above configuration, the configuration where the piston body 41C or 51C of the piston 41 or 51 is formed by the secondary process which is applied to the piston semifinished product 41B or 51B after the workpiece 41A or 51A made of a fluororesin is cut to form the piston semifinished product 41B or 51B is added. The piston 41 or 51 of the fourth or fifth embodiment is produced by cutting the workpiece 41A or 51A made of a fluororesin to mold the piston semifinished product 41B or 51B in which the folded-back portion 3 has not yet been molded, and thereafter forming the folded-back portion 3 by the secondary process which is applied to the piston semifinished product 41B or 51B. In the pump 42 or 52 comprising the piston 41 or 51 of the fourth or fifth embodiment, the piston 41 or 51 which is movably supported in the cylinder 11 to be reciprocally driven is formed by a fluororesin, the rolling portion 2 of the piston 41 or 51 has a thickness of 1 mm or less, and is flexible, the inner/outer diameter ratio of the rolling portion 2 is 80% or more, and less than 98%, the rolling portion 2 has the flange portion 7 in the open end portion of the rolling portion 2 via the approximately 180-degree folded-back portion 3, and the flange portion 7 is attached to the cylinder 11. Therefore, the same effect and function which are identical with those of the third embodiment are obtained.

With respect to the bending performance of the rolling portion, and the constant flow rate and quantitative performances of the pump, the following pistons were compared with one another: a piston (Example 1) according to the second embodiment in which the rolling portion serving as a cylindrical outer peripheral portion has a thickness of 1 mm or less, and the inner/outer diameter ratio of the rolling portion is 80% or more; a piston (Example 2) according to the first embodiment in which the rolling portion has a thickness of 1 mm or less in the same manner as Example 1, and the inner/outer diameter ratio of the rolling portion is less than 80%; a piston (Comparative example 1) in which the rolling portion has a thickness of more than 1 mm, and the inner/outer diameter ratio of the rolling portion is 80% or more; and a piston (Comparative example 2) in which the rolling portion has a thickness of more than 1 mm in the same manner as Comparative example 1, and the inner/outer diameter ratio of the rolling portion is less than 80%. Results of the comparisons are listed in Table 1 below.

more, a high constant flow rate performance of the pump was obtained in which, in a process for producing an FPD such as an LCD, the application unevenness in the case where a resist solution is applied, for example, to a glass substrate can be suppressed to 3% or less. When the inner/outer diameter ratio of the rolling portion was set to 90% or more, it is possible to suppress the application unevenness to 1% or less.

Although preferred embodiments of the invention have been shown in the first to fifth embodiments, the invention is not restricted to them, and may be variously modified without departing its spirit. In the above, for example, a piston for supplying a resist solution that is to be used in a process for producing an FPD such as an LCD, or a semiconductor device, a method of producing the piston, and a pump having the piston have been described. The invention can be suitably implemented in a piston which is used for supplying other various corrosive liquids, and which is requested to have high constant flow rate and quantitative performances, a method of producing the piston, and a pump having the piston.

What is claimed is:

1. A piston which is to be movably supported to be accompanied by a piston support member via a piston rod in a cylinder to be reciprocally driven, wherein
said piston is formed by a fluororesin, a cylindrical outer peripheral portion of said piston has a thickness of 1 mm or less, and is flexible, said outer peripheral portion has a flange portion in an open end portion of said outer peripheral portion which is closely contacted with an inner face of the cylinder, via an approximately 180-degree folded-back portion, the flange portion is attached to said cylinder, a closed end portion extending along an end face of the piston support member is disposed on the outer peripheral portion which is closely contacted with an outer face of the piston support member, and the piston support member, and the piston rod is directly coupled to the closed end portion through the piston support member.

2. A piston according to claim 1, wherein an inner diameter of said folded-back portion is 80% or more of an outer diameter.

3. A piston according to claim 1, wherein said piston is formed by a secondary process which, after a workpiece made of a fluororesin is cut to be molded into a piston semifinished product, is applied to the semifinished product.

4. A method of producing a piston which is to be movably supported to be accompanied by a piston support member via a piston rod in a cylinder to be reciprocally driven, said piston being formed by a fluororesin, a cylindrical outer peripheral

TABLE 1

| Rolling thickness A | Inner/outer diameter ratio | Bending performance | Constant flow rate performance | Quantitative performance | |
|---|---|---|---|---|---|
| More than 1 mm | 80% or more | X | Δ | Δ | Comp. Example 1 |
|  | Less than 80% | X | X | X | Comp. Example 2 |
| 1 mm or less | 80% or more | ○ | ◎ | ○ | Example 1 |
|  | Less than 80% | ○ | ○ | ○ | Example 2 |

As apparent also from Table 1 above, results in which the rolling portion having a thickness of 1 mm or less shows an excellent bending performance, and both the constant flow rate and quantitative performances of the pump satisfy use conditions in a process for producing an FPD such as an LCD, or a semiconductor device were obtained. When the inner/outer diameter ratio of the rolling portion was set to 80% or portion of said piston having a thickness of 1 mm or less, and being flexible, said outer peripheral portion having a flange portion in an open end portion of said outer peripheral portion via an approximately 180-degree folded-back portion, wherein a workpiece made of the fluororesin is cut to be molded into a semifinished product in which said folded-back portion has not yet been molded, and thereafter said folded-back portion is formed by a secondary process which is applied to the semifinished product and the piston rod is directly coupled to the closed end portion through the piston support member.

5. A pump wherein a piston which is movably supported to be accompanied by a piston support member via a piston rod in a cylinder to be reciprocally driven is formed by a fluororesin, a cylindrical outer peripheral portion of said piston has a thickness of 1 mm or less, and is flexible, said outer peripheral portion has a flange portion in an open end portion of said outer peripheral portion which is closely contacted with an inner face of the cylinder, via an approximately 180-degree folded-back portion, said flange portion is attached to said cylinder, a closed end portion extending along an end face of the piston support member is disposed on the outer peripheral portion which is closely contacted with the outer face of the piston support member, and the piston rod is directly coupled to the closed end portion through the piston support member.

* * * * *